United States Patent [19]

Thayer

[11] 4,451,373
[45] May 29, 1984

[54] RING CHANNEL AERATION APPARATUS AND METHOD

[75] Inventor: Paul M. Thayer, Shorewood, Wis.

[73] Assignee: Water Pollution Control Corp., Milwaukee, Wis.

[21] Appl. No.: 312,462

[22] Filed: Oct. 19, 1981

Related U.S. Application Data

[63] Continuation-in-part of Ser. No. 140,533, Apr. 14, 1980, abandoned, which is a continuation-in-part of Ser. No. 62,880, Aug. 1, 1978, abandoned.

[51] Int. Cl.³ .............................................. C02F 3/12
[52] U.S. Cl. ................................... 210/626; 210/629; 210/195.3; 210/220; 210/926
[58] Field of Search ............... 210/621, 623, 626, 628, 210/629, 195.3, 219, 220, 926; 261/29, 35, 36 R, 77, 122

[56] References Cited

U.S. PATENT DOCUMENTS

| | | | |
|---|---|---|---|
| 1,214,637 | 2/1917 | Zistel | 210/220 |
| 1,247,542 | 11/1917 | Jones | 210/7 |
| 1,286,017 | 11/1918 | Jones | 210/7 |
| 1,367,512 | 7/1932 | Kusch | 210/220 |
| 1,643,273 | 9/1927 | Imhoff | 210/14 |
| 1,937,434 | 11/1933 | Piatt | 210/14 |
| 2,081,382 | 5/1937 | Piatt | 210/220 |
| 2,218,635 | 10/1940 | Borge | 261/122 |
| 2,221,346 | 11/1940 | Durdin, Jr. | 210/220 |
| 2,318,728 | 5/1943 | Werking | 210/220 |
| 2,328,655 | 9/1943 | Lannert | 210/220 |
| 2,438,342 | 3/1948 | Mallory | 210/220 |
| 2,479,403 | 8/1949 | Powers | 210/220 |
| 2,708,571 | 5/1955 | Fischerstrom et al. | 210/220 |
| 2,848,203 | 8/1958 | Misiura | 210/220 |
| 3,028,011 | 4/1962 | McGivern | 210/220 |
| 3,033,372 | 5/1962 | Riddick | 210/220 |
| 3,055,502 | 9/1962 | Cunetta | 210/220 |
| 3,133,017 | 5/1964 | Lambeth | 210/220 |
| 3,133,130 | 5/1964 | Lambeth | 210/220 |
| 3,161,590 | 12/1964 | Weis et al. | 210/220 |
| 3,169,921 | 2/1965 | Griffith | 210/220 |
| 3,234,123 | 2/1966 | Hinde | 210/220 |
| 3,336,016 | 8/1967 | Schreiber | 210/220 |
| 3,470,091 | 9/1969 | Budd et al. | 210/220 |
| 3,485,750 | 12/1969 | Albertson | 210/8 |
| 3,495,712 | 2/1970 | Schreiber | 210/220 |
| 3,696,929 | 10/1972 | Shah | 210/220 |
| 3,794,303 | 2/1974 | Hirshon | 210/220 |
| 3,846,292 | 11/1974 | LeCompte, Jr. | 210/14 |
| 3,884,812 | 5/1975 | Lindquist | 210/220 |
| 3,887,459 | 6/1975 | McLaughlin | 210/15 |
| 3,893,924 | 7/1975 | LeCompte, Jr. et al. | 210/220 |
| 3,897,000 | 7/1975 | Mandt | 210/220 |
| 3,947,358 | 3/1976 | Schreiber | 210/220 |
| 3,951,758 | 4/1976 | Porsch | 210/15 |
| 3,990,974 | 11/1976 | Sullins | 210/220 |
| 4,260,486 | 4/1981 | Reid | 210/197 |

FOREIGN PATENT DOCUMENTS 2300373  7/1973  Fed. Rep. of Germany ...... 210/219

OTHER PUBLICATIONS

Pentech Houdaille, Water and Wastewater Systems, P-J T-476, 1977.
Water Pollution Control Corporation, Bulletin M45, 1969, Custom Engineered Activated Sludge Plants.
Journal Water Pollution Control Federation, Jul. 1978, "The Effect of Tank Dimensions and Diffusor Placement on Oxygen Transfer", Frank Schmit et al.
Flygt-A Subsidiary of ITT-Article "Look Who's Mixing it up in Wastewater".
Journal Water Polluton Control Federation, May 1981.

*Primary Examiner*—Ernest G. Therkorn
*Attorney, Agent, or Firm*—Pollock, Vande Sande & Priddy

[57] ABSTRACT

In a ring channel aeration system, circulation is provided by one or more hydraulic jumps while the major portion of the energy consumed in aeration is allocated to the release of oxidative process gas through horizontally non-propulsive bubble release means having an oxygen transfer efficiency of at least about 6. The hydraulic jump(s) may be powered by discharge of gas (e.g. the same gas used for aeration) through gas discharge means, in which case the system of gas discharge means and bubble release means may have an overall oxygen transfer efficiency of at least about 6. The invention has advantages of flexibility and resultant energy savings as compared to single device circulation/aeration systems, in that excessive energy need not be consumed in aeration to obtain the requisite circulation and vice versa.

133 Claims, 14 Drawing Figures

RING CHANNEL AERATION APPARATUS AND METHOD

BACKGROUND OF THE INVENTION

The present invention relates to ring-channel aeration systems and in particular to ring channel aeration systems having separate means for applying mixing energy and aeration gas to waste water.

One widely known form of ring channel aeration system, known as the "oxidation ditch", is used to perform an extended aeration process and is generally a long narrow continuous typically oval or circular channel containing an aerating device. Oxidation ditches with brush- and paddle-wheel type aerators have enjoyed considerable commercial use both in Europe and the United States.

Design specifications for oxidation ditches with capacities in the range of 0.10 to 2.0 million gallons per day have been published by the U.S. Environmental Protection Agency. Such ditches are regarded as providing stable processing with proper sludge management, production of high quality effluent and predictable process behavior. Among the disadvantages of oxidation ditches which have been discussed in the literature are icing of aerator supports, the need for a crane to remove equipment for major maintenance, frequency of maintenance on drive units, the requirements for good operator skills and routine monitoring, the possible need for provision for nitrification oxygen and pH control, and the applicability of only one type of aeration device.

However, oxidation ditches have long been known in which circulation and aeration have been provided by means which bubble air into the waste water in the ditch from a source beneath the water surface. For example, see U.S. Pat. Nos. 1,643,273, 3,336,016, 3,485,750 and 3,884,812. U.S. Pat. Nos. 3,495,712 and 3,947,358 disclose oxidation ditches having both stationary and moveable aeration means positioned beneath the surface of the waste water, the moveable aeration means serving to keep at least a portion of the contents of the ditch in motion. The latter patent teaches that it is unfavorable to provide an oxidation ditch with circulation means comprising transverse partitions having through-flow openings, in that such partitions considerably reduce the through-flow cross-section of the ditch and represent throttle zones, which have rendered known installations unsuitable for the treatment of large quantities of sewage.

In contrast with the foregoing it has been suggested in U.S. Pat. No. 3,846,292 to provide an oxidation ditch whose liquid flow path is free from obstructions to flow other than are unavoidably presented by certain ejectors submerged in the water, and to employ said ejectors as the sole means for aeration and movement of the liquid. Such installations are said to be particularly efficient in terms of reduced horsepower requirements. However, it has been suggested in the literature that ejectors have a poorer oxygen transfer efficiency than other known diffusers, such as for example ceramic dome fine bubble diffusers.

Questions as to the oxygen transfer efficiency and operating costs of existing oxidation ditch systems, as well as continuously rising costs for energy, have created need for further improvements which offer higher efficiency. The present invention is directed to this need.

SUMMARY OF THE INVENTION

The foregoing object may be attained by providing a ring channel aerator with hydraulic jump means located in said channel. The hydraulic jump means extends between inner and outer wall means defining the channel and is oriented generally transversely of the flow path along which the waste-water circulates in the channel. The jump means is adapted to induce an upward and forward motion in the waste water as it passes through and out of the jump. Only a minor portion of the length of the flow path, measured along the centerline of the channel, is occupied by the jump means. Along the remainder of the flow path is positioned horizontally non-propulsive bubble release means having an oxygen transfer efficiency of at least about 6 for bubbling oxidative process gas into the waste water.

The above apparatus is useful in a variety of processes, including an energy-saving method which is also considered to be part of the present invention. In this flexible and economic technique, a particularly advantageous balance is maintained between the energy consumed in circulation and the total energy used in circulation and aeration. According to the method of the invention, horizontal circulation is induced by imparting energy to the waste water within a minor portion of the length of a horizontal circulation path in a ring channel aerator. Along the remainder of said path, oxidative process gas is bubbled into the waste water through horizontally non-propulsive bubble release means having an oxygen transfer efficiency of at least about six. In this method the circulation rate preferably is less than about 1 foot per second averaged over the transverse cross-section of the channel. Circulation is induced by causing upward and forward motion of the waste water as it passes through and exits at least one propulsion zone or zones, such as for instance the hydraulic jump means mentioned above. The propulsion zone or zones are located in and extend transversely of the horizontal flow path, around which the waste-water circulates in the channel, but said propulsion zone or zones occupy only a minor portion of the length of said flow path, measured along the centerline of the channel. A ratio in the range of about 0.01 to about 0.35, more preferably about 0.02 to about 0.25 and most preferably about 0.03 to about 0.2 is maintained between the horsepower consumed in inducing said circulation and the total of said horsepower plus the adiabatic horsepower consumed in the horizontally non-propulsive bubbling of process gas into the waste water. When the energy used to induce circulation is transmitted to the waste water by discharge of gas into the propulsion zone(s), this energy is also expressed in adiabatic horsepower for purposes of the above ratio.

In the accompanying drawings, referred to below, and in the following description of preferred embodiments may be found illustrations of how the foregoing apparatus and method may be embodied and used.

DESCRIPTION OF THE PREFERRED EMBODIMENTS

Figure 1:
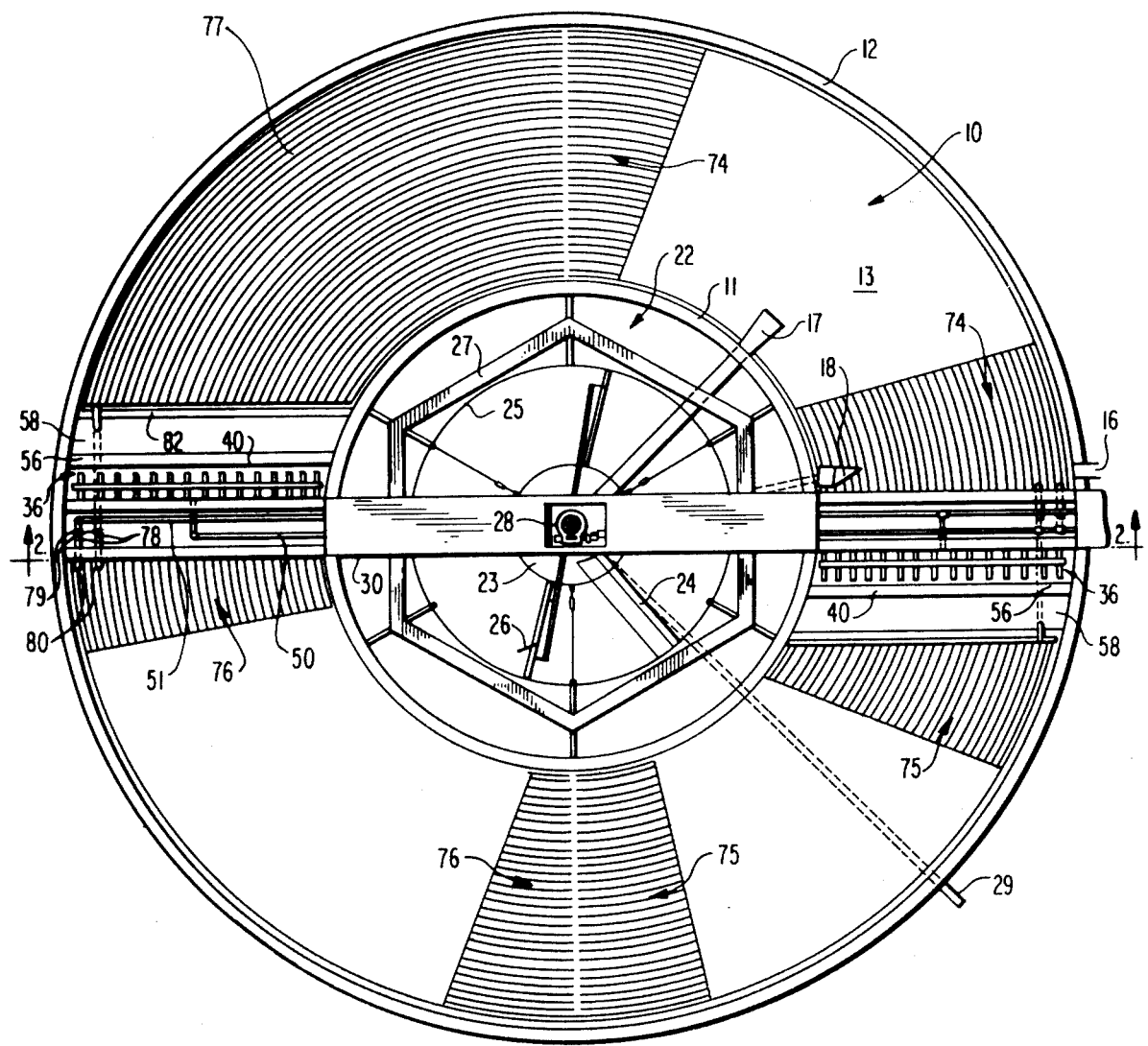
FIG. 1 is a plan view, with parts broken out and omitted, of a ring channel aerator having a flow path along which are positioned jump means and horizontally non-propulsive bubble release means.
Figure 2:
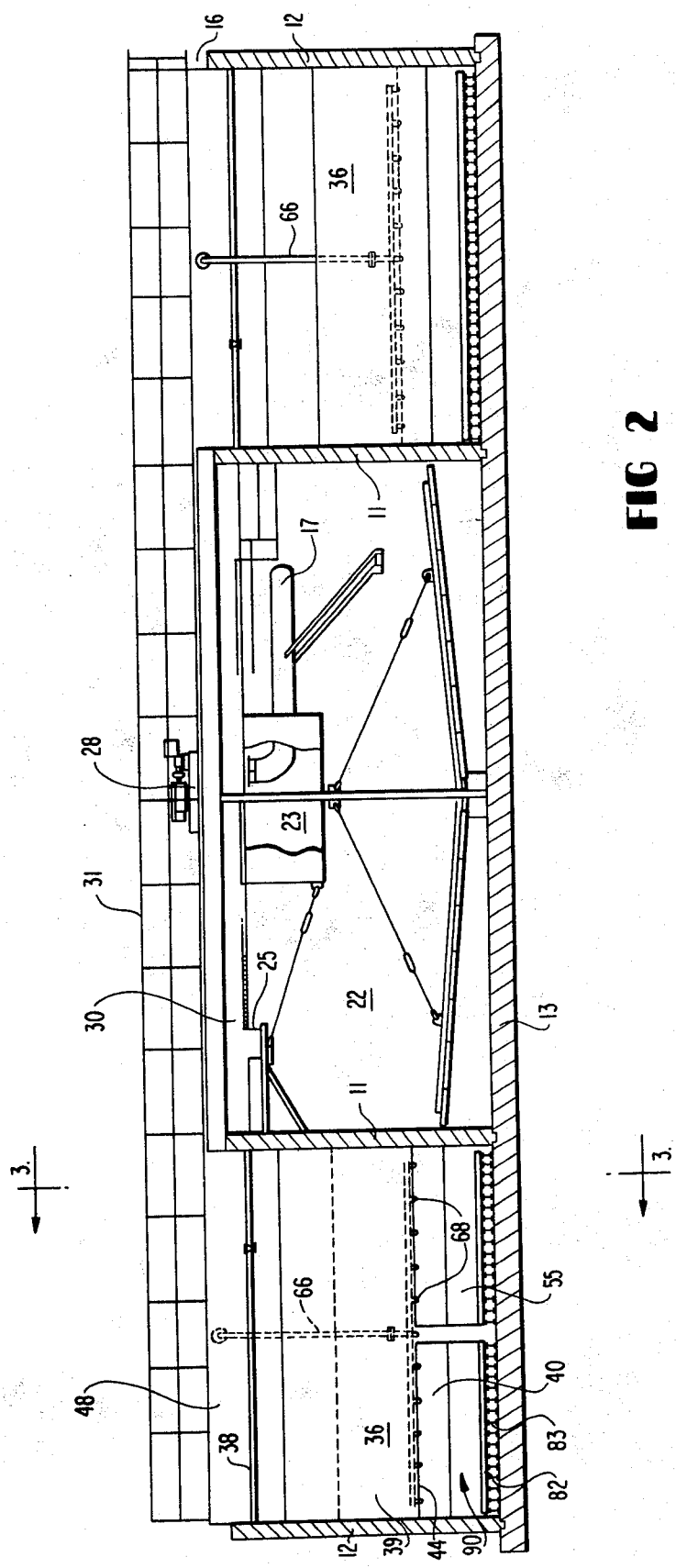
FIG. 2 is a sectional view taken along section line 2—2 of FIG. 1.

FIGS. 1 and 2 disclose a preferred form of ring channel aerator 10 which may if desired be combined for purposes of convenience with an optional clarifier to be described in greater detail below. The ring channel aerator comprises inner and outer walls which may be of any appropriate shape so as to define a liquid circulation circuit of circular, oval (racetrack), elliptical, serpentine or other shape as viewed in plan view. Said walls may also be of vertical, sloping, curved or other suitable configuration as viewed in transverse cross-section. However, in the preferred embodiment the inner and outer walls 11 and 12 are circular as viewed in plan view (FIG. 1) and vertical in transverse cross-section (FIG. 2). A bottom wall is optional, such as for instance if the inner and outer walls slope to an intersection with one another, but the channel is preferably provided with a bottom wall 13, connected to inner and outer walls 11 and 12. The bottom wall is substantially horizontal for convenient mounting of diffusers, to be described in greater detail below.

Walls 11, 12 and 13 define an elongated flow path which may in general have any appropriate width, length to width ratio, depth and internal configuration useful for ring channel aerators. While the width of the channel may vary around the circuit, the inner and outer walls in this embodiment are equidistant throughout the circuit or channel which they define. According to the presently preferred mode of practicing the invention, the ratio of the flow path length measured along the center line of the channel, relative to the average width of the channel measured throughout the height of its transverse cross section at and below the normal operating water level, is at least about 5. For example, the ratio of flow path length to channel width, measured as indicated above, may be in the range of about 5 to about 15 and more preferably about 8 to about 10.

The depth of the channel may be varied at different locations around the flow path, but the channel is most conveniently arranged to have a uniform depth throughout. Ring channel aerators are known which have channel depths as shallow as 3 feet and it will be possible to practice the invention in these shallow channels. But for the most part the invention will be employed in channels whose average depth, measured from the bottom of the channel to its normal operating water line, is at least about 5 feet. For example, depths of about 5 to about 20 feet may be employed. The invention can be operated with particular advantage in channels having a depth of about 10 to about 20 feet, with about 12 to about 15 feet in depth being considered optimum.

In general it will be seen that the walls 11, 12 and 13 define a continuous substantially closed course for liquid circulation such as is common to the extended aeration activated sludge type of oxidation ditch. Although not essential, it is preferable that the ring channel be substantially free of obstructions to flow other than the hydraulic jump means to be discussed below.

The aerator may have one or more inlets and outlets of any appropriate configuration and location. In the present embodiment, the aerator is provided with waste-water inlet 16 which may be connected to a source of waste-water (not shown) which may for instance include a bar screen or comminutor followed by an aerated grit chamber with clarifier to dewater the grit. In this particular preferred embodiment sewage inlet 16 is closely adjacent and upstream of hydraulic jump means to be described hereinafter. A return sludge inlet, e.g. measuring weir 18, is closely adjacent to and upstream of said jump means and delivers sludge to the channel. This inlet is also preferably located just upstream of the aforementioned hydraulic jump. In this embodiment the effluent outlet is a transfer pipe 17, located more nearly upstream than downstream of waste-water inlet 16. Pipe 17 is preferably located a short distance upstream of the inlet and weir, and provided to withdraw mixed liquor from the channel.

The optional clarifier may be of any conventional type, but certain economies can be attained if the wall of clarifier tank 22 is defined by the aerator inner wall 11. In this embodiment, the clarifier has the usual stilling well 23, scum trough 24, scum baffle 25, surface skimmer 26, effluent launder 27, and sludge collector drive 28. The clarifier includes a suitable sludge air lift and sludge divider (not shown) for sending recovered sludge back to the aerator 10 via weir 18, and/or to appropriate sludge holding or disposal facilities via waste sludge line 29. Clarified water from the clarifier may be carried by a conduit (not shown) to a receiving body of water or to suitable post treatment facilities.

A bridge 30 (portions removed in FIG. 1), equipped with handrail 31 (FIG. 2), extends along a diameter line of the apparatus from one side of outer wall 12 to the other, and in so doing bridges across the aerating channel 10 and the clarifier tank 22. This bridge provides support for the sludge collector drive 28 and a means of access by which an operator may supervise the operation of the unit.

According to the method of the invention, circulation is induced by causing upward and forward motion of the waste water as it passes through and exits at least one propulsion zone or zones. The propulsion zone or zones include lifting means, i.e. one or more members and/or media within the propulsion zone or zones, which directly apply a substantial net upward force vector or vectors to the waste water. Such lifting means may for example include impellers and/or gas discharge devices in a variety of configurations, with or without adjacent cooperating baffles (including shrouds), to apply the desired upward force vectors. For example, if the liquid propulsion means is a propeller, it may be mounted with its rotating axis horizontal and tangent or parallel to the channel longitudinal axis, and positioned to direct liquid downstream against a closely adjacent baffle inclined upwardly in the downstream direction. If the propeller axis is inclined upwardly in the downstream direction, it can produce both forward and upward motion in the liquid. A propeller having its rotating axis vertical may also produce the desired upward and forward motion in cooperation with suitable baffling by directing the propeller discharge against the underside of a baffle inclined upwardly in the downstream direction. The propulsion means, whether of the impeller or gas discharge kind, can be mounted within one or more shrouds or chimneys with which the propulsion means cooperates to directly apply the desired substantial net upward force vectors. Thus there is a substantial net elevation of the liquid as it proceeds through the propulsion zone(s). Such elevation is of assistance in inhibiting the deposition of suspended solids on the channel bottom between propulsion zones, even where the gas output of the horizontally non-propulsive bubble release means between propulsion zones is turned down to save power and is insufficient to keep all the solids in suspension. Preferably, the above-described lifting and elevating action is applied in such a way that each time liquid makes a complete circuit of the channel, substantially all of the liquid making such circuit is subjected to the lifting action, elevated, and propelled forwardly on the flow path, with or without a forward rolling action referred to in greater detail hereinafter.

The velocity in the tank can be expressed in terms of a certain number of feet per second, averaged over the entire length and transverse cross-section of the flow path. This average will be the resultant of a multitude of additive and substractive vectors (including for example eddy currents) throughout the length and cross-section of the liquid circuit in the channel. Contributing factors to this average velocity are the velocities imparted by the propulsion means, by the introduction of waste-water and return sludge (if any) into the channel, and by the discharge of treated water from the channel. In most instances, the velocity contribution of the introduction and discharge will be very small. Thus, the velocity contributed by the propulsion means will be a multiple such as 10, 20 or 40 or more times the introduction/discharge velocity contribution. While the energy release in the propulsion means and the resultant velocity contribution should be sufficient to cause the liquid to continue in motion around the entire length of the channel, they are not so large as to cause an average velocity in the channel exceeding 1 foot per second, which has frequently been mentioned in the literature as important from the standpoint of sufficiently inhibiting fall out of suspended solids in the channel. It has been found that the present invention can achieve effective mixing of untreated wastewater with the channel contents while adequately retaining solids in suspension even though circulating the channel contents at an average velocity less than 1 foot per second. Thus although it is preferred that the circulation velocity be at least about 0.1 or 0.2 feet per second, the process can be successfully operated if the velocity is less than about 1 foot/second preferably less than about 0.7 foot/second, still more preferably less than about 0.5 foot/second and, in one recent installation, typically about 0.3–0.4 feet per second. Substantial energy savings can be realized through operating at these relatively low velocities. Low velocities restrict the amount of headloss sustained when passing the channel contents through a propulsion zone or zones having a passageway or passageways of substantially reduced cross-sectional area relative to the transverse cross-sectional area of the portion of the channel immediately upstream thereof. At these velocities, an energy efficient mode of operation can be carried out in which the energy released in the propulsion zone(s) is insufficient to keep the solids content of the wastewater in a substantially suspended condition throughout the channel. In such operation, the discharge of oxidative process gas through the horizontally non-propulsive bubble release means is distributed sufficiently extensively throughout the channel, and is sufficient in quantity and rate, so that such discharge is able, in combination with the lifting action of propulsion means in the propulsion zone(s), to keep the suspended solids contents of the tank substantially suspended outside the propulsion zone(s). Thus, the propulsion means is not required to sustain the entire burden of preventing dropout of suspended solids, and a portion of this burden is borne by the horizontally non-propulsive bubble release means which, in many cases, is able to bear this burden more efficiently than the propulsion means. However, it should also be understood that the lifting action generated in the propulsion zone(s), when combined with the lifting action of the horizontally non-propulsive bubble release means, may in many cases be sufficient to inhibit solids dropout outside the propulsion zone(s) even when the horizontally non-propulsive bubble release means is discharging oxidative gas in quantities per unit floor area (e.g. less than about 0.12 SCFM per square foot) and per unit of waste water volume (less than about 6 SCFM per thousand cubic feet) which, in and of themselves, have generally been considered insufficient for sustaining solids in suspension.

The invention preferably utilizes a hydraulic jump means. In general the hydraulic jump means is located in the channel 10, extending between inner and outer wall means 11 and 12, generally transversely of the flow path, and may be any device which is capable of inducing upward and forward motion in the waste water as it passes through and out of the jump. Such device, or all such devices combined, should occupy only a minor portion (e.g. less than half) of the length of the circulation flow path measured along the centerline of the channel, and preferably occupy about 20% (or 10%) or less of said length. Thus the jump means should be capable of inducing the requisite motion within the indicated portion of the flow path length.

In general, the preferred mode of operation for the jump means is to establish upward flow in the jump while positively urging said flow in a forward (i.e. downstream) direction as the flow departs the jump.

The forward flowing wastewater is discharged from the jump as a stream. It is preferred but not essential that this stream include the upper surface of the wastewater downstream of the jump. Again, although not absolutely essential, it is definitely preferred that the jump means direct the outgoing stream into a zone of abruptly increased cross-section immediately downstream of said jump. Such abrupt increase is of assistance in inducing a forward roll in the wastewater.

When sufficient energy is imparted to the wastewater in the jump, it can form a wave in the wastewater as it exits the jump, and may even form a continuation of the rolling motion well downstream of the zone. With proper design of channel and jump geometry one may create forward-rolling eddy currents that roll forward, downward, rearward and upward, downstream of the jump, thereby extending retention of bubbles of oxidative process gas. In certain situations the rolling motion generated by the jump may also assist in flocculation of suspended solids in the wastewater.

The structure of a particularly preferred form of hydraulic jump means may be described as a substantially upright chimney member extending for substantially the entire depth of the channel between its bottom and the normal operating water line of the channel. This chimney has an upstream inlet in the lower half of the channel depth and a downstream outlet in the upper half of the channel depth. The downstream end of the chimney may be connected to, or at least partly defined by, a member defining the abrupt change in cross-section referred to above. Said member preferably defines a sufficiently abrupt change in cross-section from the chimney outlet to the full cross-section of the channel downstream thereof for causing water which exits the chimney outlet to whirl or roll about a generally horizontal axis transverse to the flow path.

A structure of the above type which is particularly preferred is disclosed in FIGS. 1 through 5. In the first two of these figures the hydraulic jumps 36 (of which there are two in this embodiment) are shown along with the rest of the components of the ring channel aerator, being shown from overhead in FIG. 1 and from upstream on the left side of FIG. 2. The jump alone is shown in enlarged sections in the next three figures, being shown in longitudinal cross-section in FIG. 3, transverse cross-section in FIG. 4 and horizontal cross-section in FIG. 5.

In the embodiment of FIGS. 1-5 the substantially upright chimney member 37 extends through the entire depth of the channel between bottom wall 13 and the normal operating water line 38 of the channel 10. The chimney is defined in part by an upstream upper water baffle 39 and a downstream lower water baffle 40 and by portions of inner and outer channel walls 11 and 12, as well as by channel bottom wall 13.

As will be recognized by persons skilled in the art, the upstream water baffle 39 may have a variety of shapes, sizes and positions. However, in the present embodiment this baffle is combined with or part of a "Y" wall 41 which, as viewed in the longitudinal cross-section of FIG. 3, includes a first limb 42 inclined rearwardly and upwardly, thus providing a transition surface for smoothly directly surface water downwardly along the upstream face of upstream water baffle 39 towards upstream inlet 43 whose upper portion is defined by a lower edge 44 of baffle 39. Although it is particularly convenient for the upstream baffle to be combined with or part of a "Y" wall as shown and to extend well above the water line, one may actually employ any desired form of upstream water baffle that projects downward from an elevation at or above the water line part way to the bottom of the channel, and that is associated with an upstream inlet lying generally beneath, below or generally at the foot of said baffle. The elevation of the top and bottom of inlet 43 may be varied but it is believed that the optimum placement for the bottom of the inlet is at substantially the same elevation as the bottom of the channel.

"Y" wall 41 of this embodiment also includes a second limb 47 inclined forwardly and in the downstream direction from the downstream face of water baffle 39. Although not essential, the inclined surface provided by limb 47 may be of assistance in positively urging the flow of water rising in the chimney 37 in a forward direction. Such inclined surface, when provided, preferably extends at an angle of at least 45° relative the horizontal. Generally upright extensions 48 and 49 on "Y" wall limbs 42 and 47 respectively may support a grating (not shown) providing a continuation of bridge 30 by means of which an operator may walk across the jump. Beneath such grating and in the space between limbs 42 and 47 and extensions 48, 49 may be mounted supply pipes 50 and 51 for feeding gas to a gas discharge means (when such is provided to power the hydraulic jump) and to horizontally non-propulsive gas release means (to be discussed in greater detail below).

Downstream lower water baffle 40 may be embodied in a wide variety of shapes, sizes and positions as will be recognized by those skilled in the art. In the present embodiment the downstream lower water baffle projects upward partway to the surface from an elevation at (including near) the bottom of the channel.

As shown in this embodiment, baffle 40 includes an upwardly and downstream-directed inclined surface 55 which is of assistance in smoothly directing water received through inlet 43 in an upward direction into the chimney space between baffles 39 and 40. Baffle 40 has an upper edge 56 which defines the bottom of a downstream outlet 57. The bottom of this outlet and its top (if it has one) may be varied in shape and position; however it is preferred that the top of the outlet, if such is provided, should be at or above the water line so that the forward flowing stream of wastewater discharged from the jump may include the upper surface of the wastewater which flows in the downstream direction as it departs the jump. Thus, outlet 57 should extend from beneath the water to an elevation at or above the normal operating water-line of the channel.

The wide divergence of the downstream face of baffle 40 from the direction of flow through outlet 57 (e.g. by an angle of about 45° or more) provides the abrupt change in cross-section referred to above. As explained above, if the water is caused to depart outlet 57 with sufficient energy there can be a whirling or rolling of the water about a generally horizontal axis downstream of baffle 40. A forwardly and downstream-inclined surface 58 on baffle 40 is of assistance in smoothly directing the lower portion of any such whirling or rolling currents upwardly along the downstream face of baffle 40, wherein such currents may join with additional wastewater departing outlet 57 for entraining bubbles and flocculating suspended solids as indicated above.

Although the chimney as shown is defined by substantially vertical wall means it will be apparent that the chimney may be tilted forwardly or rearwardly so long as it is substantially upright. Thus, the substantially upright chimney member 37 may include baffles 39 and 40, the entireties or major portions of which are preferably vertical, as shown, or may be inclined from the vertical in the downstream direction by an angle of about 45° or less, more preferably about 30° or less and still more preferably about 15° or less.

Depending on the length of the flow path, one may provide one or any number of jumps at spaced locations along such path. A spacing of one hundred feet or more between jumps appears feasible. In general, it is desirable that the jumps be equally spaced along the path, but this is not essential.

Because of its configuration, the hydraulic jump accelerates the flow of water which passes through it. This is accomplished in part by propulsion means (to be described in greater detail below) and in part by a reduction of the cross-section of the chimney as compared to the portions of the channel which are upstream and downstream of the jump. In general, the respective ratio or ratios of the areas of the inlet, chimney, and outlet, measured normal to the direction of flow in each of them, relative to the transverse cross-sectional area of the channel, measured at and below its normal operating water line and averaged along the entire length of said flow path, is in the range of about 0.2 to about 0.7. In respect to the inlet, a preferred value of said ratio is about 0.2 to about 0.5, with about 0.33 being considered best. Similarly, preferred values for the ratio of chimney area to average transverse channel cross-sectional area are in the range of about 0.2 to about 0.5, with about 0.33 being considered best. Usually the chimney horizontal cross-section will include a length-wise spacing between baffles 39 and 40 measured tangent or parallel to the channel longitudinal axis of at least about 3 feet to provide sufficient room for mounting of the propulsion means. Regarding the outlet, the values presently preferred and considered best for the above-mentioned ratio are respectively about 0.2 to about 0.5 and 0.33. It is considered advantageous if all of the foregoing ratios are relatively similar, to minimize head losses, whereby all three of the above-mentioned ratios are for example in the range of about 0.2 to about 0.5, more preferably about 0.25 to about 0.4 and still more preferably about 0.3 to about 0.37, with a ratio of about 0.33 being considered best, and that the chimney have substantially the same cross-section throughout. It is also beneficial if the inlet, the interior of the chimney and the outlet are all of substantially the same width as those portions of the channel which are closely adjacent to and both upstream and downstream of the chimney. It is preferred that the elevation of the top of the inlet should for the most part be at or appreciably below the elevation of the bottom of the outlet.

In certain ring channel configurations, one's ability to attain economic operation may depend to some extent on the ratio of chimney width (side to side distance) to the depth of the water in the channel at the chimney location. In oval or racetrack style channels it is recommended that this ratio be at least about 0.7, more preferably at least about 1 and still more preferably at least about 2 or higher. However, this design criterion is deemed to be of lesser or no importance in plants with circular channels.

In accordance with the invention the hydraulic jump means is provided with propulsion means which may be in a wide variety of types, shapes, sizes and positions. Preferably the propulsion means is positioned for distributing energy into the wastewater across substantially the entire width of the chimney. Such energy is utilized for causing the upward and forward motion to occur. With sufficient width-wise uniformity of distribution, the upward and forward motion of the water, with or without the above-described rolling motion, may occur across substantially the entire width of the chimney, but it should be noted that perfect uniformity is not necessarily essential or desireable. For example, in a ring channel aerator in which the wastewater following the outer wall must traverse a greater distance per circuit than the water which follows the inner wall, it can be beneficial to cause a relatively higher flow rate in the wastewater adjacent the outer wall as compared to that adjacent the inner wall. This may for instance be accomplished by providing the propulsion means with means for imparting energy to the wastewater at a higher rate adjacent the outer wall than adjacent to the inner wall. Also, it has been found that when the propulsion means is positioned for imparting the major portion of the energy to that half of the water in the chimney which flows nearest the upstream water baffle 39, undesirable short-circuiting of the water can occur within the jump, with resultant loss of jump effectiveness. Thus, it is recommended that care be taken to distribute the energy release substantially throughout the distance between the baffles 39 and 40 to inhibit short-circuiting.

The propulsion means may be positioned within the chimney 37 and/or in one or more locations outside the chimney or in the chimney walls (from which locations the propulsion means may direct energy into the chimney). However, the preferred location for the upward propulsion means is within the longitudinal space between the upstream and downstream water baffles. As pointed out in the preceding discussion of the method of the present invention, a variety of devices are useable as propulsion means, including mechanical impellers and the like. But a considerable advantage in convenience and/or efficiency may be attained by employing a gas discharge means positioned in the chimney for inducing the motion described, the gas discharge means being preferably positioned for distributing bubbles across substantially the entire length and width of the chimney for causing said upward and forward motion. A suitable example of such gas discharge means is shown in FIGS. 1–5. It should be understood however that a wide variety of gas discharge means may be employed including, without limitation, the horizontally non-propulsive bubble release means described hereinafter, whether of the fine bubble type or not.

Figure 3:
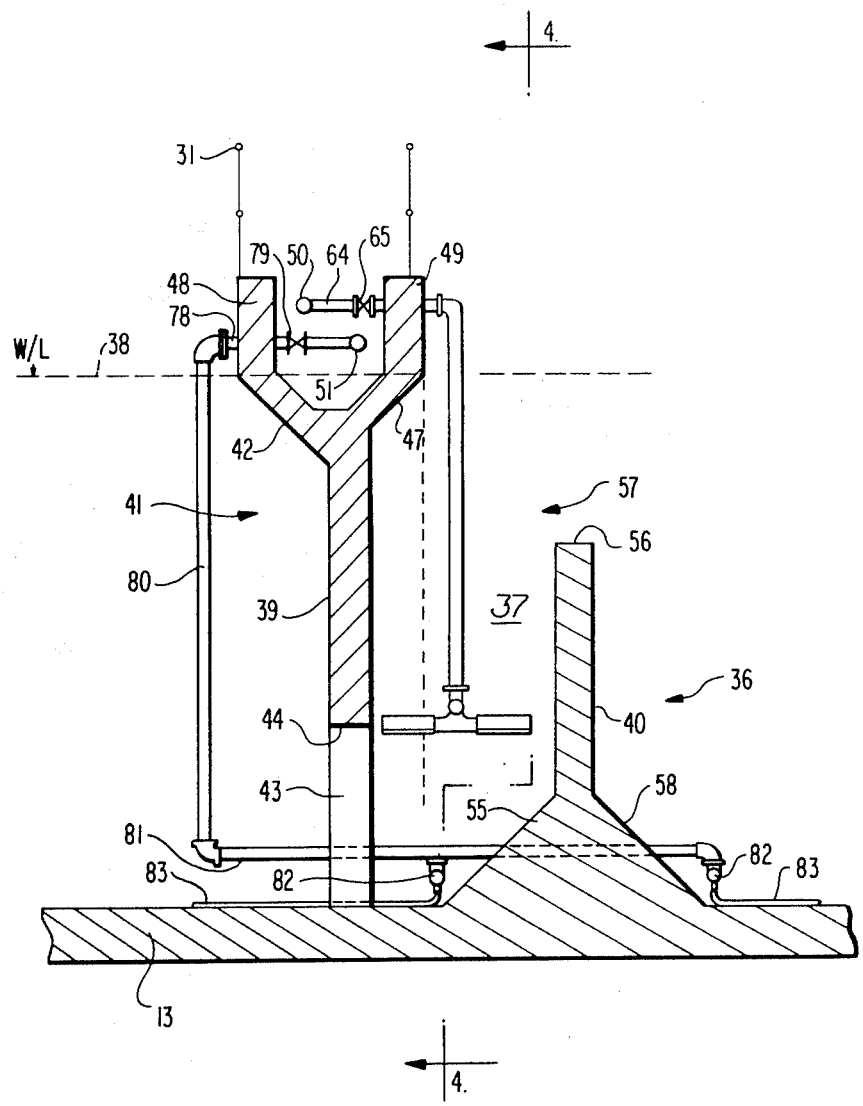
FIG. 3 is a sectional view taken along section line 3—3 of FIG. 2.
Figure 5:
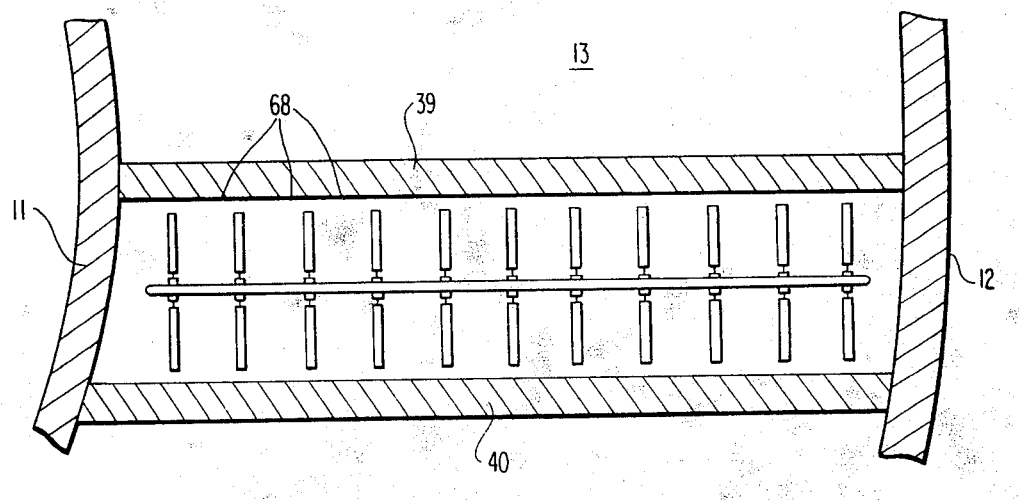
FIG. 5 is a sectional view taken along section line 5—5 of FIG. 4.
Figure 4:
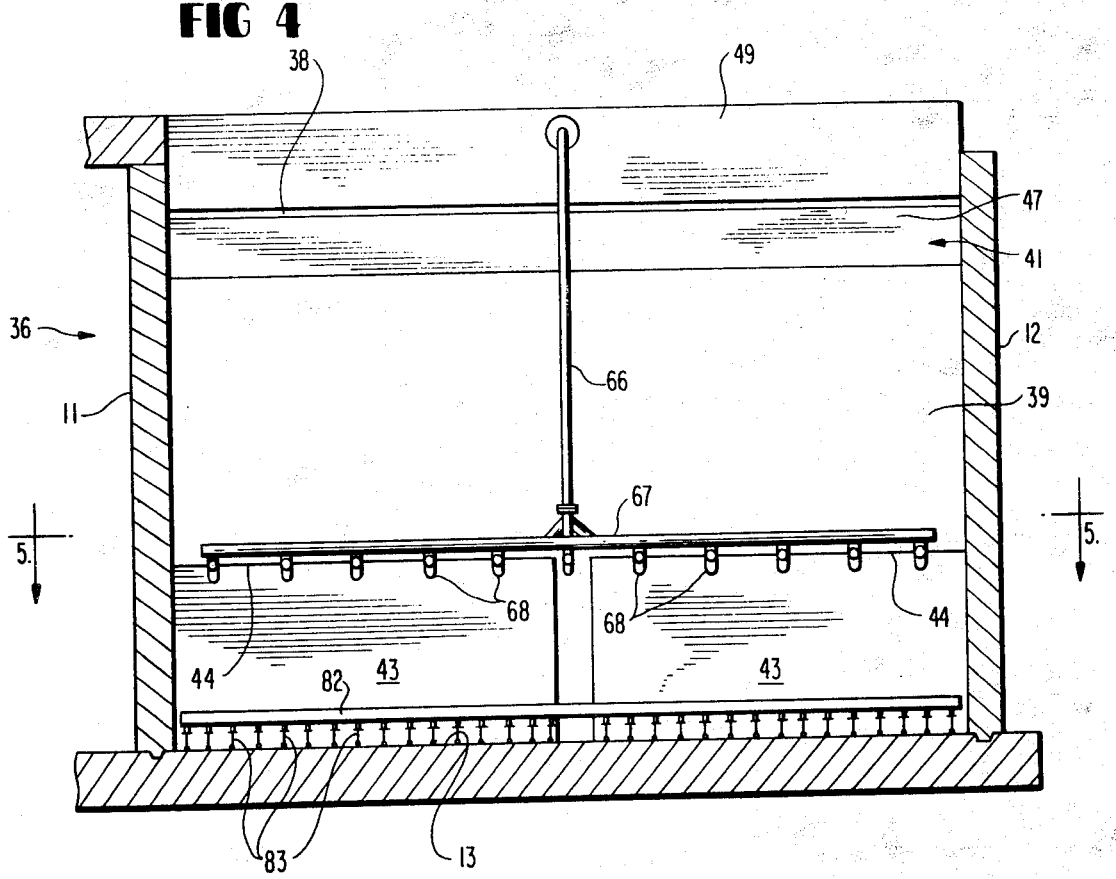
FIG. 4 is a sectional view taken along section line 4—4 of FIG. 3.

The gas discharge means disclosed in FIGS. 1–5 is mounted in such manner that the gas discharged thereby is distributed across more than half and preferably across substantially the entire horizontal distance between the upstream and downstream water baffles. The gas discharge means may be of any configuration and may be mounted in any suitable location to accomplish the foregoing; however as shown in FIGS. 3–5 there are advantages of convenience and conservation of materials involved in positioning the gas discharge means on the upper water baffle.

Referring now to FIGS. 3–5, the gas discharge means includes a conduit arrangement having a horizontal leg 64 connected to supply pipe 50 and extending through control valve 65 and "Y" wall extension 49 to a single vertical downcomer pipe 66 feeding into the center of a horizontal manifold pipe 67 extending transversely of the water flow path in chimney 37, generally parallel to the downstream face of baffle 39. The diffusers 68 are of the general type disclosed in U.S. Pat. No. 3,424,443 to Paul M. Thayer, the entire disclosure of said patent being incorporated herein by reference, and are distributed at uniformly spaced intervals across the width of the manifold and chimney and protrude horizontally from both sides of manifold 67 in the upstream and downstream directions, extending equally close to the inner surfaces of both of the baffles 39 and 40.

In order to maintain manifold 67 in a fixed position against the force of the wastewater flowing up the chimney 37, it may be necessary to provide suitable structural supports (not shown) which will be readily designed, fabricated and installed by persons skilled in the art. But it may in certain circumstances be more desirable from the standpoint of reduced construction cost (for structural supports) and convenience (by providing the flexibility of being able to temporarily remove some but not all of the diffusers), if small groups of diffusers are provided with their own downcomers. Thus, such arrangement could be preferred over that shown in the drawings in certain circumstances.

The diffusers are arranged in this embodiment so that they cover not more than about 25% of the lineal distance from one side of the interior of the chimney to the other side thereof. This tends to minimize the amount of interference that will occur between diffuser structure and the flow of water up the chimney. In this connection the use of concentrated bubble diffusers is particularly advantageous. Commercially available forms of diffusers shown in the above mentioned Thayer patent can for example be operated at an oxidative gas discharge rate in the range of about 0.05 to about 0.5 SCFM, and more preferably about 0.1 to about 0.3 SCFM, per square inch of chimney cross-sectional area, transverse to flow direction, occupied by the diffusers.

It is believed that, from the standpoint of propulsion efficiency, there is an optimum rate of gas release per unit of length or area in a hydraulic jump. The optimum may vary to some extent, depending for example on the jump dimensions and the type and arrangement of the gas discharge means. However, by way of example, in a jump with the preferred coarse bubble diffusers and with a width (side to side) of 24 feet and a length (horizontal inside distance, baffle to baffle) of 3.5 feet it appears that the rate of discharge of gas through the gas discharge means, averaged over the width of the jump, should be in the range of about 1 to about 10, more preferably about 1.5 to about 4 and optimally about 2 to about 3 SCFM, per foot of width. Correspondingly, the average oxidative gas discharge rate, averaged over the chimney cross-sectional area should be about 0.25 to about 3, preferably about 0.4 to about 1.2 and optimally about 0.55 to about 0.9 SCFM per square foot of chimney cross-sectional area, measured normal to the direction of flow where the gas is discharged. A jump designed in accordance with the above criteria appears capable of inducing adequate circulation along a channel length of 100 feet or more, and of producing flow through the jump chimney at economic rates, e.g. at a rate of flow, measured in gallons per minute, which is at least about 30 or 40 times the product of the operating pressure (psi) and delivery rate (cfm) at the outlet of the blower furnishing gas to the gas discharge propulsion means in the jump.

In general, the gas discharge means is advantageously positioned with its gas discharge outlets at a level of submergence equal to at least about half the depth of the upstream upper water baffle 39, measured downward from the normal operating waterline of the channel. It is presently considered that the optimum elevation for the gas discharge outlets is at about the same elevation as, or slightly below, the lower edge 44 of the chimney upstream inlet 43, and about 1 foot or more below the upper edge 56 of downstream water baffle 40. Establishing the elevation of the bottom of the chimney outlet for the most part substantially above the gas discharge outlets of the propulsion means is preferred from the standpoint of affording sufficient opportunity for acceleration of the liquid in the chimney prior to reaching the outlet. Provided the rising gas bubbles and resulting liquid currents are not permitted to escape to the upstream side of the upstream upper water baffle 39, it will be found that the volume of wastewater pumped by the jump will increase with increasing depth of submergance of the gas discharge outlets.

In general the horizontally non-propulsive bubble release means applicable to the invention are generally efficient aerators, but are not necessarily useful for fostering a net horizontal circulation of wastewater around the channel. The invention contemplates the use of bubble release means having the characteristic that one or more of them, collectively, are unable to produce a net or overall horizontal velocity of 0.3, or more preferably 0.1, feet per second in wastewater in a ring channel, averaged over a longitudinal cross-section of said channel which passes through the bubble release means in question. A particularly preferred bubble release means produces no substantial net horizontal velocity measured in the above manner. On the other hand it should be noted that some of the applicable bubble release means may provide good localized mixing of the wastewater (e.g. in the vicinity of the bubble release means), but not necessarily so. For example, it is contemplated to employ in the invention bubble release means capable of emitting oxidative gas in a form and amount sufficient for satisfying the aeration requirements for treatment to a 90% removal of $BOD_5$ and suspended solids at a retention time in the range of about 18 to 24 hours, and which may or may not be sufficient to mix the wastewater adequately to prevent sedimentation.

Examples of useful bubble release means include fine bubble ceramic porous plate type diffusers, such being commercially available from Water Pollution Control Corporation of Milwaukee, Wis. and from others, as well as flexible plastic tubing type diffusers, which are commercially available from several sources (e.g. Lasaire tubing, a product of Lagoon Aeration Corporation of Milwaukee, Wis.). At least some of the commercially available tubing products release fine bubbles as defined herein.

While the horizontally non-propulsive bubble release means is positioned along that portion of the flow path which remains after deduction of the portion occupied by the hydraulic jump means, this does not necessarily imply that the bubble release means extends along the entire remaining flow path, or that it covers the entire remaining floor area of the channel. It will not always be necessary to aerate throughout the flow path in order to maintain the wastewater in an aerobic condition; and there may be certain circumstances, such as for instance when it is desired to practice denitrification, when anaerobic conditions may be desired. Thus, although a given zone may be rendered anaerobic in a number of ways, such as for instance by introducing raw sewage and/or sludge having a high oxygen demand at the beginning of such zone, anaerobic conditions can also be attained by not aerating certain portions of the flow path outside the hydraulic jump means. There can be other reasons for providing bubble release means along only a portion of the remainder of said path. For example, it may be desired to employ bubble release means mounted on swing units, whereby such bubble release means may be swung up and out of the channel for servicing. In such circumstances it is beneficial to arrange the bubble release means in one or more relatively compact arrays. When a sufficient number of bubble release means are arranged in such a manner, and the oxygen requirements of the wastewater are not too large, oxygen transfer requirements may be satisfied even though substantial portions of the flow path between such arrays are unoccupied. In such case, the ceramic plate type diffusers may for example occupy as little as about 15 to 20% of the length of the flow path outside the hydraulic jump means, measured along the center line of the channel. Thus, the invention is not restricted to a particular percentage of occupancy of the remainder of the flow path by the bubble release means. However, it is nevertheless preferred that the bubble release means occupy at least about 40%, more preferably at least about 60%, and still more preferably at least about 90% of the length of the flow path measured along the centerline of said channel. It is considered optimum to have the bubble release means occupy substantially the entire flow path outside the hydraulic jump means.

The degree of occupancy of that flow path, just mentioned, may or may not be equivalent to the degree of occupancy of the total floor area in the channel. For example, if the channel has a flat bottom with outer walls having a sloped configuration, and if the horizontally projected area of the sloping outer walls is regarded as part of the floor area of the channel, the flow path occupancy will not be equivalent to floor area occupancy. In such case the above mentioned percentages of occupancy, i.e. 15–20%, 40%, 60% and 100%, may be based on the horizontal floor area of the channel outside the hydraulic jump means.

Figure 6:
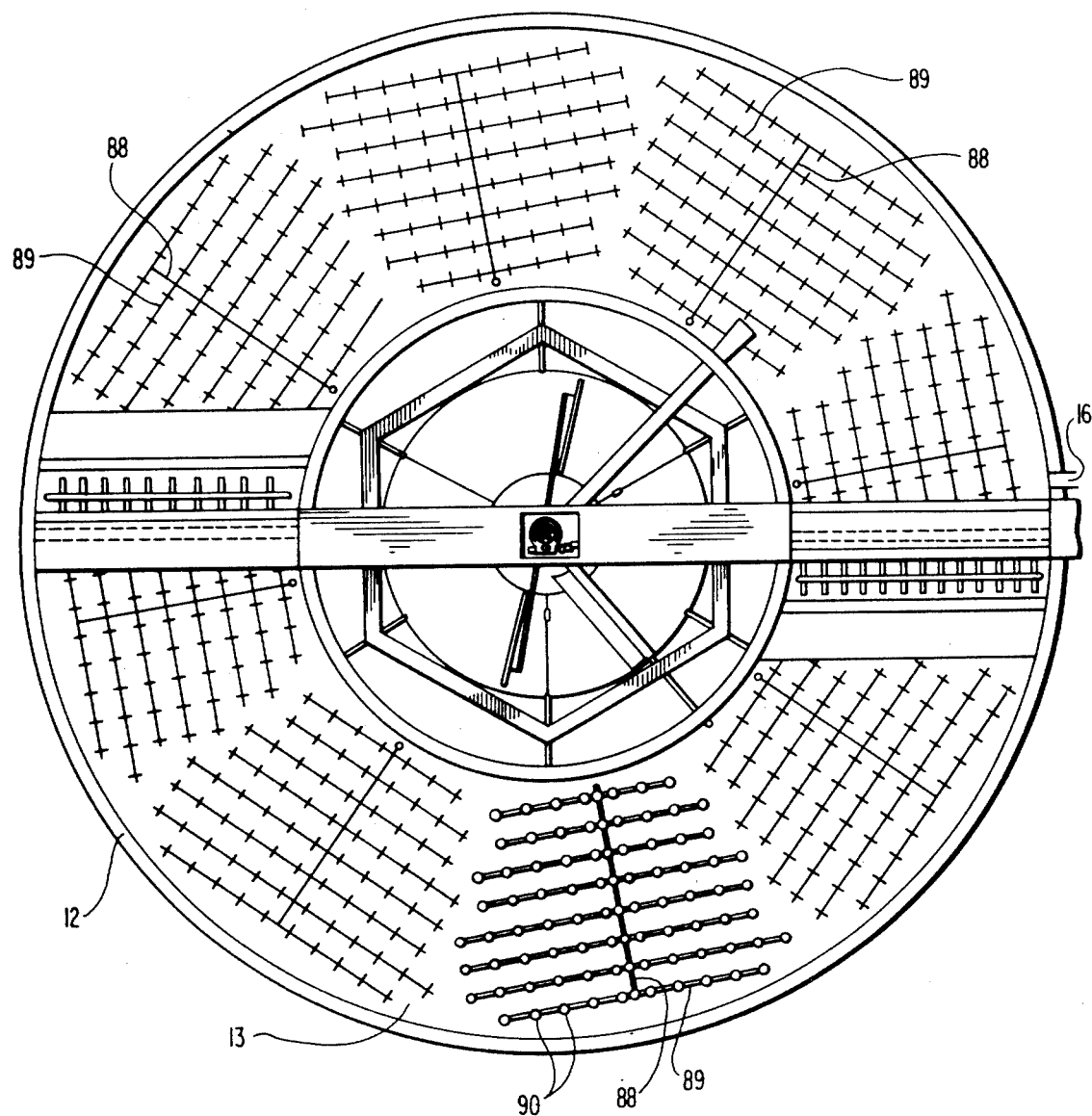
FIG. 6 is a plan view, in part similar to FIG. 1, of an alternate form of ring channel aerator having different bubble release means.

Considerable flexibility of construction and operation may be attained when employing bubble release means which comprise plural arrays of diffusers with each such array comprising a plurality of diffusers having a common supply conduit. For example, when the diffusers are apertured tubing type diffusers they may be laid in segmented circular patterns which generally follow and extend along the flow path as illustrated in FIG. 1. When the diffusers are ceramic plate diffusers they may be arranged in arrays which include generally radially disposed supply conduits and horizontal headers arranged generally perpendicular to said supply conduits with the ceramic plate type diffusers being arranged at spaced locations along the headers as shown in FIG. 6. Such arrays may be spaced about or closely spaced to distribute oxidative process gas over a portion or substantially all of the area of the floor of the channel outside the hydraulic jump means.

For additional details of preferred embodiments of the bubble release means, attention is drawn to FIGS. 1-3. These disclose the use of the above mentioned Lasaire TM tubing. In the figures, as best shown by FIG. 1, the tubing is arranged in four separate arrays with individual air supplies each including tubing laid in the form of segments of a circle generally along the flow path around the channel. The four arrays indicated by reference numerals 74–77 terminate at the hydraulic jumps and at the 6 and 12 o'clock positions on the drawing; note that portions of arrays 74–76 are broken out in FIG. 1. The following description of arrays 76 and 77 is analgous to arrays 74 and 75.

FIGS. 1-3 show that arrays 76 and 77 have oxidative procoss gas supply conduits including horizontal legs 78 extending through individual control valves 79 and "Y" wall limb extensions 48 to downcomer pipes 80 and horizontal feeds 81, connected to manifolds 82. The horizontal legs 78, control valves 79 and downcomer 80 are all visible in FIG. 1, but only one of each is visible in FIG. 3, being hidden behind that one member of each pair which is visible in the figure. The tubing 83 is attached at equally, radially spaced points along manifolds 82 and is arranged in the circular pattern referred to above. The foregoing illustrates how at least some of the arrays can have separately controllable gas supplies connected to their supply conduits. By appropriate setting of valves 79 one may adjust certain of the arrays 74–77 to higher or lower gas rates per unit area of channel flow. Certain of the control valves 79 may also be closed to prevent release of gas from a portion of said arrays while other arrays are in operation.

An alternate form of bubble release means is disclosed in FIG. 6, which is generally similar to FIG. 1, but employs ceramic plate type diffusers instead of the flexible aeration tubing described above. The embodiment of FIG. 6 includes the same channel, hydraulic jump arrangements, clarifier, sewage inlet, sludge inlet and mixed liquor outlet shown in FIG. 1. Instead of the oxidative process gas supply conduits 51, manifolds 82, tubing 83 and other associated conduits disclosed in FIGS. 1-3, the FIG. 6 embodiment includes a supply manifold (not shown) which is connected to a source of oxidative process gas, such as air, and which may run around the base of inner wall 11 above or below bottom wall 13. To this manifold are connected a plurality of generally radially disposed horizontal supply conduits 88. Horizontal headers 89 are connected to said supply conduits at equally spaced intervals and arranged generally perpendicular thereto. Ceramic plate type diffusers 90 are arranged at spaced locations along each of said headers. It should be understood that each of the arrays includes the ceramic plate type diffusers 90, even though the diffusers are drawn in on only one of the arrays shown in the drawings. While these diffusers are spaced apart and therefore do not physically cover all of the area of the floor of the channel, they are distributed over substantially the entire floor area, so that they can supply gas to substantially all of the wastewater in the channel.

Figure 7:
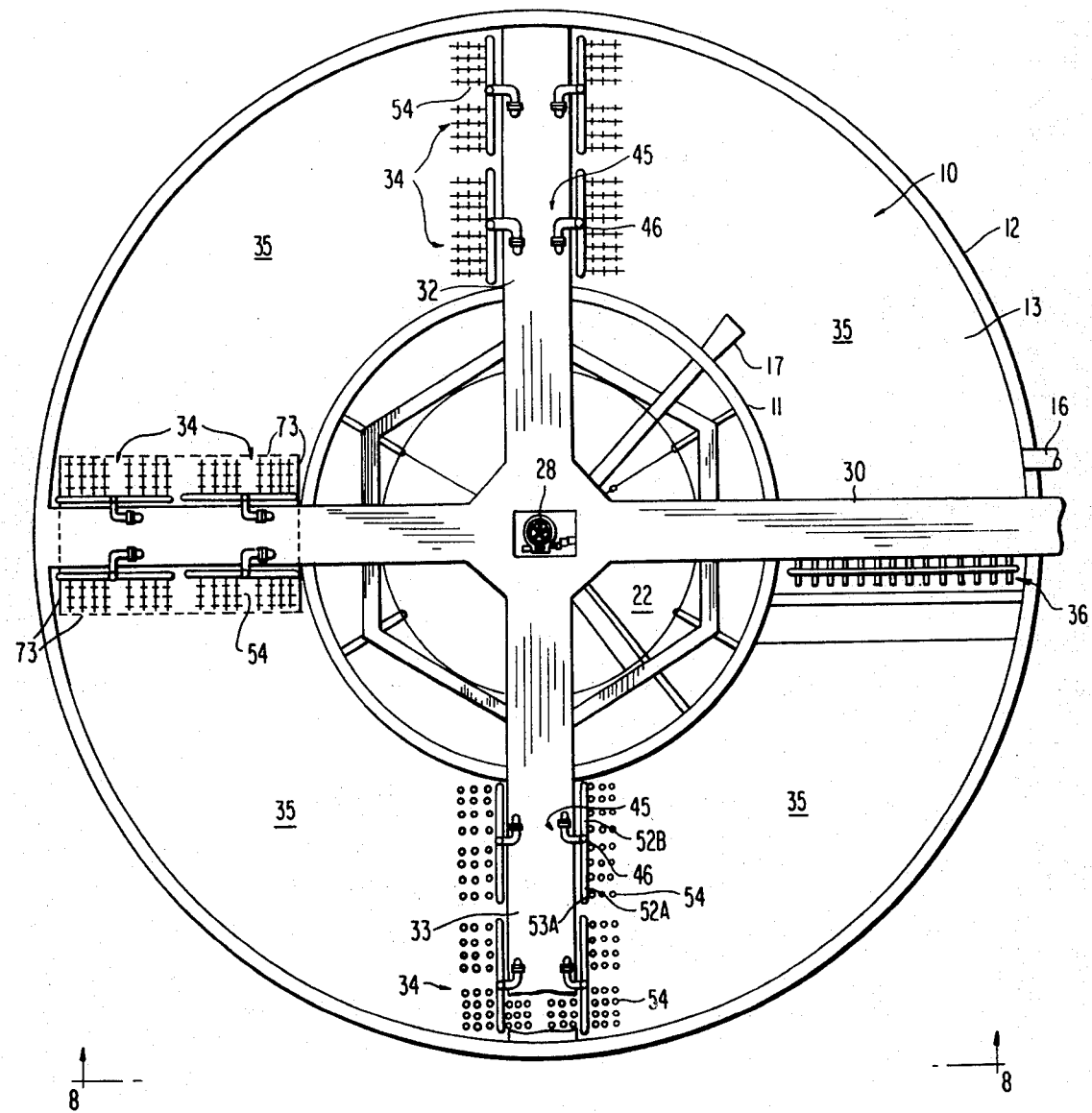
FIG. 7 is a plan view, in part similar to FIG. 6, of still another alternate form of ring channel aerator having the bubble release means positioned at spaced intervals along the flow path.

As mentioned previously, when the oxygen transfer requirements of the process are not too large, it is possible to meet process oxygen requirements by employing a smaller number of diffusers than are shown in FIG. 6, such diffusers being arranged in relatively compact arrays whereby the diffusers are distributed over less than the entire floor area, and whereby substantial portions of the flow path outside the hydraulic jump means are not occupied by bubble release means. The foregoing is illustrated by the embodiment of FIG. 7. It discloses a ring channel aerator which is similar to that of FIG. 6 in certain respects.

The FIG. 7 embodiment provides a channel 10 formed by inner and outer walls 11, 12 and bottom wall 13. These three walls define a flow path for circulation of wastewater under treatment. Optionally inner wall 11 may surround or define a clarifier tank 22 similar to that shown in greater detail in FIGS. 1 and 2. Channel 10 has a wastewater inlet 16 in outer wall 12, and a transfer pipe 17 in inner wall 11 communicating with clarifier tank 22. As in the FIG. 6 embodiment there is a bridge 30 which extends across the aerator extending between the right and left sides as viewed in FIG. 7, said bridge being provided with handrail 31 (see FIGS. 3 and 8). When a clarifier 22 is provided, its drive unit 28 may be located on bridge 30 centrally of tank 22. FIG. 7 includes a hydraulic jump 36 like those used in FIG. 6 and disclosed in greater detail in FIGS. 1–5, and said hydraulic jump occupies a relatively small portion of the above mentioned flow path.

Among the dissimilarities of the FIG. 6 and 7 embodiments is that the latter includes only one jump 36 instead of two. Also, in the FIG. 7 embodiment bridge 30 has two extensions 32 and 33 extending horizontally perpendicular to the bridge, said extensions appearing to extend upward and downward respectively as viewed in plan view in FIG. 7. Whereas the horizontally non-propulsive bubble release means of FIG. 6 are secured to the bottom wall 13 of channel 10, said means are suspended from the bridge in three sets of relatively compact arrays 34 in FIG. 7. The three respective sets of arrays 34 are suspended, in clockwise order, from bridge extension 33, from the left portion of bridge 30 and from bridge extension 32. Note that a portion of bridge extension 33 is broken out to show that portions of all of said arrays 34 may extend beneath the respective portions of the bridge. Note also that the three sets of arrays 34 are positioned along the remainder of the above mentioned flow path in such a way that significant portions 3 of the length of the flow path outside the hydraulic jump means are not occupied by the bubble release means.

The respective arrays 34 include ceramic plate type diffusers 54 which receive oxidative gas via gas mains (not shown) and tees (not shown) under the respective bridge portions, said tees being connected to elbow fittings 45 secured to the respective bridge portions and connected to vertical downcomer pipes 46. The latter feed oxidative gas through half-headers 52 (52A,52B) and cross-headers 53 (53A–53H) to the diffusers 54. The aforementioned elbow fittings 45, vertical downcomer pipes 46, half-headers 52 and cross-headers 53 may be arranged in a fixed manner whereby the diffusers 54 in said arrays 34 are fixedly secured in a horizontal plane a short distance, e.g. a few inches or feet, above channel bottom wall 13.

However, it is preferred to provide for securing the arrays, with means having the capability of swinging said arrays up out of channel 10 to a position alongside the respective bridge portions for servicing. A number of devices of this type have been described in the prior art, but a preferred example is provided by U.S. patent application Ser. No. 115,470, filed Jan. 25, 1980, by Paul M. Thayer, for Improved Swing Diffuser, now U.S. Pat. No. 4,294,696, the entire disclosure of which is hereby incorporated herein by reference. One embodiment of the subject matter of said application, as applied to the present invention, is shown in FIGS. 7–10 of the present disclosure.

Figure 8:
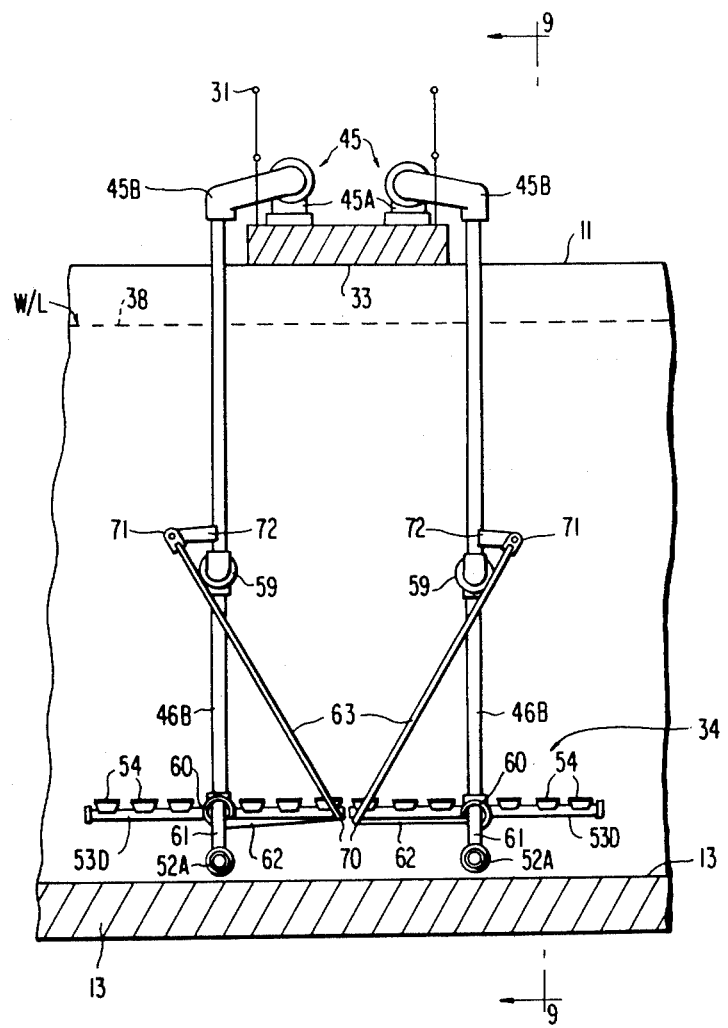
FIG. 8 is a partial sectional view taken along section line 8—8 of FIG. 7.
Figure 9:
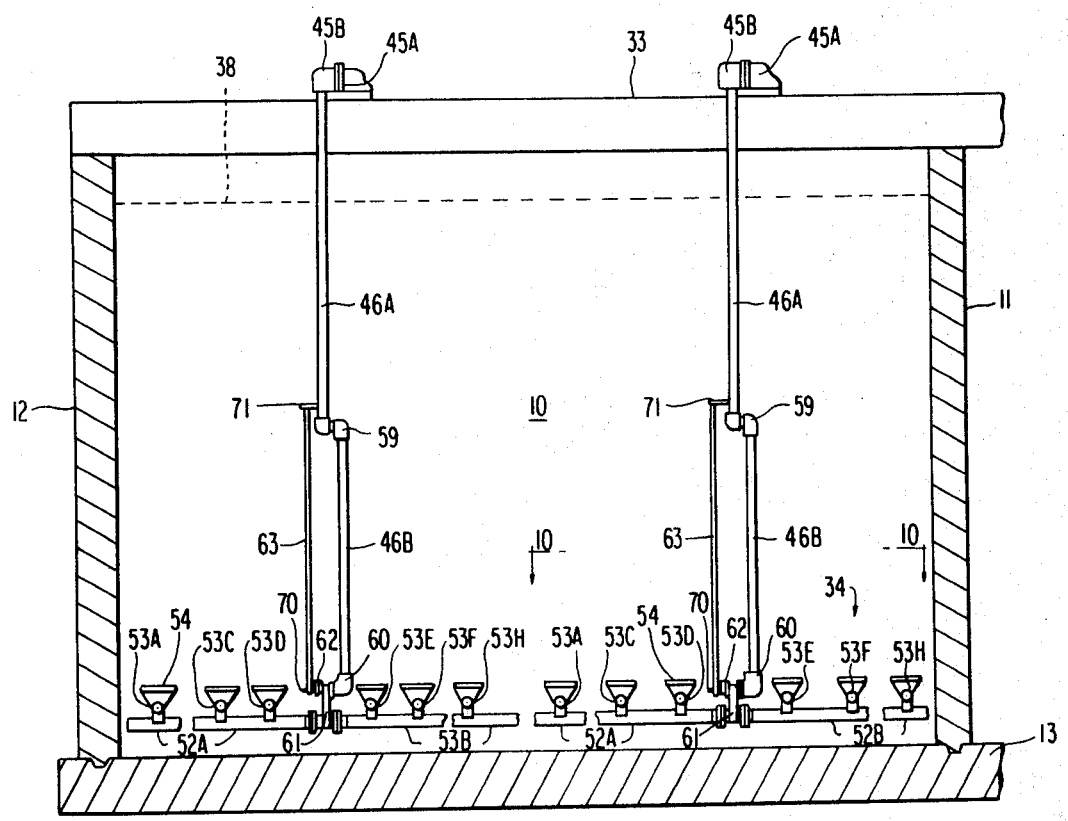
FIG. 9 is a partial sectional view taken along section line 9—9 of FIG. 8, with portions foreshortened.
Figure 10:
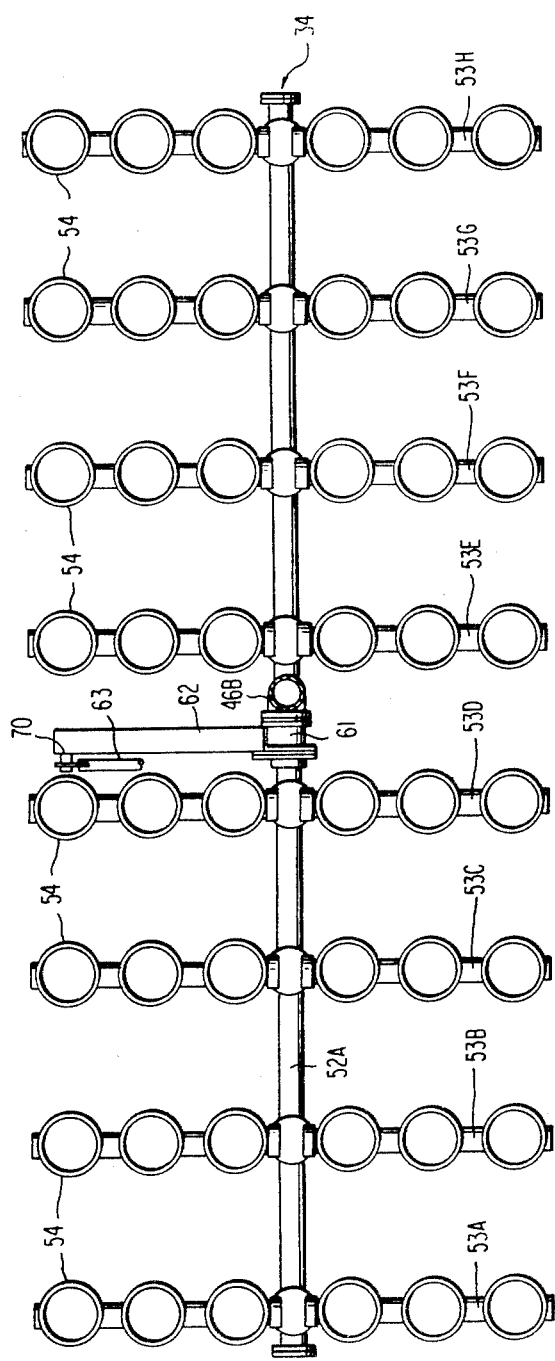
FIG. 10 is a sectional view taken along section line 10—10 of FIG. 9 including a full view of subject matter foreshortened in FIG. 9.

As shown in FIGS. 7–10, and particularly in the larger scale FIGS. 8–10, a plurality of hollow stanchion portions 45A of elbow fittings 45 are connected to the above mentioned air mains, tees and bridge or bridge extensions 30, 32, 33. Said fittings also include hollow swing elbow portions 45B which can pivot about stanchion portions 45A in essentially vertical planes. Downcomer pipes 46 are divided into rigid tubular upper hanger arms 46A and rigid tubular lower hanger arms 46B. Upper hanger arms 46A are attached to elbows 45 so that arms 46A extend downwardly into the channel 10 below water level 38 as illustrated. Conventional hollow knee joints 59 pivotably connect upper arms 46A to lower arms 46B, so that a major portion or all of each lower arm 46B can be folded toward the respective upper arm 46A and the two arms rotated upwardly to a collapsed position at and/or above bridge extension 33. Although rigid, hollow arms are preferred both to carry the oxidative gas and to support the diffuser array, flexible tubing supported by rigid arms may also be used.

At the lower portion of each arm 46B, in this embodiment at its lower end, a hollow swing elbow 60 is provided which is pivotably mounted to a hollow header connector 61, so that upper hanger arm 46A and header connector 61 have their longitudinal axes in a common vertical plane. A pair of hollow half-headers 52A, 52B are rigidly connected to header connector 61 and extend laterally from the vertical plane of arm 46A and header connector 61. For balance, half-headers 52A,52B preferably are of equal length. A plurality of cross-headers 53A–53H are mounted on top of half-headers 52A,52B and preferably at right angles thereto. An array of diffusers for oxidative gas is defined by a further plurality of individual plate diffuser assemblies 54 extending upwardly from half-headers 53A–53H.

Assemblies 54 preferably comprise diffusers of the type disclosed in U.S. Pat. No. 4,261,933 of Lloyd Ewing and David T. Redmon, in U.S. patent application Ser. No. 952,891, filed Oct. 19, 1978 by Lloyd Ewing, David T. Redmon, Paul M. Thayer, Frank L. Schmit and William E. Roche, for Sewage Aeration System (now abandoned) and in its continuation-in-part, Ser. No. 102,175, filed Dec. 10, 1979, now U.S. Pat. No. 4,288,394, the entire disclosures of which are hereby incorporated herein by reference. However, those skilled in the art will appreciate that other types of diffusers could be used without departing from the scope of the present invention.

Conventional header stops or rests (not shown), attached to the channel 10 and/or to supports (not shown) on the outermost cross-headers, can be used to position the apparatus in the orientation shown in FIGS. 8 and 9. Alternatively, or in addition, the arrays can be used to position the apparatus in the orientation shown in FIGS. 8 and 9. Alternatively, or in addition, the arrays can be weighted to retain them in their desired, substantially horizontal operating position near the bottom wall 13 of the channel.

A swing diffuser having many of its diffuser assemblies 54 located at a considerable distance from half-headers 52A, 52B can be readily used in the present embodiment, because the array 34 of diffusers can be pivoted to a substantially upright position (not shown) convenient for servicing. Handrails 31 on bridge 30 and its extensions 32,33 may include movable portions or gates (not shown) to accommodate upward pivoting of elbow 45 and arms 46A,46B. Using conventional hoists (not shown) arms 46A and 46B are raised to folded position above bridge 30, while lever arm 62 and reach arm 63 cause rotational movement of each diffuser array 34 from its operating position to its servicing position.

Lever arm 62 is rigidly attached to header connecter 61 and extends, in the illustrated embodiment, in a plane essentially parallel with the array 34. Of course, arm 62 need not be parallel with the array for the swing diffuser to function as indicated; however the parallel arrangement is preferred due to its compact geometry. Or, arm 62 may comprise one of cross-headers 53D,53E, suitably strengthened for the purpose, rather than a separate element as illustrated. Reach arm 63 is pivoted at its lower portion to the outer portion 70 of lever arm 62. The upper portion 71 of reach arm 63 is pivoted at a point fixed relative to but movable with upper hanger arm 46A. In the illustrated embodiment, upper end 71 is pivoted at the end of an offset flange 72 rigidly attached to the lower portion of upper hanger arm 46A.

As indicated above, the arrays 34 of diffusers 54 occupy only a portion of the length of the remainder of the flow path, i.e. that portion which remains after deduction of the portion occupied by the jump 36, which itself occupies only a minor portion of the length of the flow path. Moreover, in the FIG. 7 embodiment the arrays 34 occupy only a relatively small portion of the remainder of said flow path. The percentage of said remainder which is occupied by said arrays can be determined on a plan view of the aerator by determining the fraction of said remainder which is covered by the envelope(s) surrounding the area(s) occupied by the diffusers. For example the envelope surrounding the area occupied by the diffusers 54 under the left end of bridge 30 in FIG. 7 is indicated by reference lines 73.

In accordance with the invention, advantages of flexibility and savings in power may be realized through the feature of separate power means for the hydraulic jump means and bubble release means. According to a first aspect of this feature of the invention, it is preferred that the ring channel aerator comprise a first power means connected to the hydraulic jump means. This is for supplying energy to the jump and for inducing the upward and forward motion referred to above. A separate, second power means is connected to the horizontally non-propulsive bubble release mans. This is for supplying energy to the bubble release means to bubble oxidative process gas into the wastewater. According to a second aspect of this feature of the invention, it is preferred that the first and second power means be separately controllable. In this fashion the volume of oxidative process gas released through the horizontally non-propulsive bubble release means may be reduced or increased in response to reductions and increases in the oxygen demand of the wastewater. Because of the use of separate power means, as above described, such reduction or increase does not require corresponding reduction or increase in the energy supplied through the hydraulic jump means for circulation. According to still another aspect of this feature of the invention, it is preferred that the energy supply capacity of the second power means, as installed in the system, be larger than that of the first power means. More specifically, the capacity of the second power means may be sufficiently large in relation to the energy supply capacity of the first power means, for causing the second power means to supply the major portion of the total energy supplied by the first and second power means, both for inducing the upward and forward motion of the wastewater and for discharging oxidative process gas through the bubble release means. According to still another aspect of this feature of the invention, the hydraulic jump means may comprise gas discharge means for inducing the wastewater motion described above. In connection with any of the foregoing four aspects, either or both of the power means may be a compressor (including without limitation centrifugal blowers and positive displacement types) and a motor (including without limitation electric motors and internal combustion engines of all types), the respective power means being appropriately connected to the respective gas discharge means and bubble release means.

Figure 11:
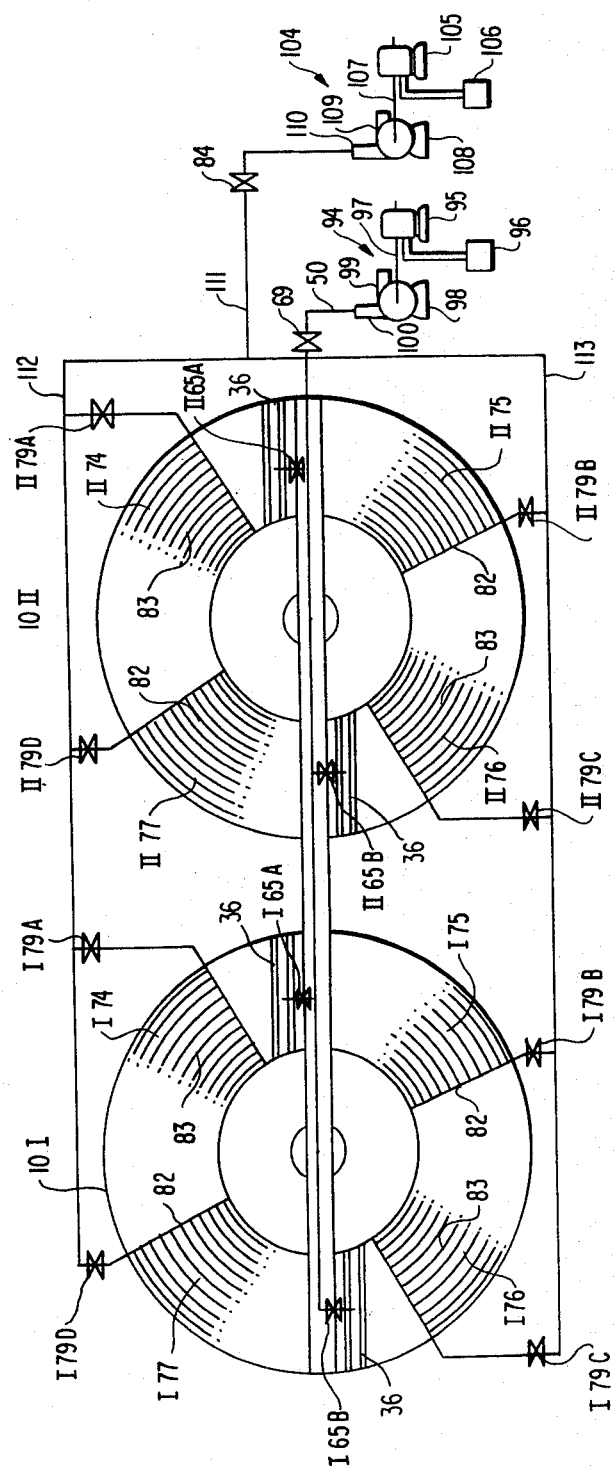
FIG. 11 is a schematic diagram of a pair of co-located ring channel aerators according to the invention, showing motors, compressors, and their connections to hydraulic jumps and horizontally non-propulsive bubble release means in the respective aerators.

A particularly preferred embodiment of the foregoing is disclosed in FIG. 11. In the figure, the first power means 94 includes motor 95 having a controller 96 and connected via shaft 97 with compressor 98 having inlet 99 and outlet 100. The controller 96 may be set manually or automatically, such as by means of a liquid level and/or liquid velocity sensing means or the like in the channel. The compressor 98 may be a single compressor or a battery of compressors, may be arranged to draw process gas from atmosphere or elsewhere, and may have conventional inlet filters, water traps and other associated equipment (not shown).

The first power means described above is connected via supply pipe 50 with hydraulic jumps 36 in two ring channel aerators 10I and 10II via master control valve 69 and individual control valves I65A, I65B, II65A andII65B for the individual jumps in the two ring channel aerators. With controller 96, master control valve 69 and the individual control valves one may control the pressure in supply pipe 50 and the relative flow to the several jumps. This has a number of possible advantages. For example, it appears that more power is required to commence circulation in a ring channel aerator than to sustain circulation once the desired rate of circulation has been attained. Thus, for example, once circulation has been commenced, it may be possible to reduce the air flow to all jumps in a given aerator, or to shut off the supply of air to one or more of the jumps while maintaining the air rate to the other jump or jumps at the same level, an increased level or possibly even a reduced level. Moreover, the provision of separately controllable air supplies for the jumps within a given aerator afford opportunity for controlling the allocation of the horsepower consumed in circulation, as compared to the total horsepower consumed in circulation and horizontally non-propulsive release of oxidative process gas into the wastewater.

As is also shown by FIG. 11, the embodiment described in the preceding paragraph also includes a second, separate power means 104 having motor 105, controller 106, shaft 107, compressor 108, inlet 109 and outlet 110. Here again the controller 106 may be manually or automatically set, such as for instance by means for automatically sensing the oxygen demand of the wastewater in the ring channel aerator and converting the oxygen demand to a control signal to which the controller is responsive. As previously noted, the second power means may be, and preferably is, sufficiently large in relation to the energy supply capacity of the first power means, so that it supplies the major portion of the total energy supplied by the two power means. Thus, the major portion of the energy is supplied in this instance to eight arrays of horizontally non-propulsive bubble release means I74–I77, and II74–II77 via supply pipe 111, master air valve 84, branch conduits 112,113 and individual control valves I79A, I79B, I79C, I79D, 1179A, and 1179B, 1179C and 1179D. In this fashion the flow of air or other oxidative process gas to the manifold 82 and tubing 83 of the several arrays may be separately controlled. This has a number of advantages. For example, it is of assistance in the allocation of energy consumption between circulation and horizontally nonpropulsive bubbling of oxidative process gas into the circulating wastewater. Moreover it has been suggested in the literature that de-nitrification may be attained in a ring channel aerator by providing anaerobic zones. Thus, for instance, the ring channel aerators depicted in FIG. 11 could be provided with anaerobic zones by reducing or completely shutting off the flow of oxidative process gas to one or more arrays of the bubble release means which are downstream from the inlet(s) (not shown) for the wastewater and, if any, for the return sludge. Alternatively, for example, it is possible to direct the greatest part of the air flow to the array or arrays immediately downstream of the inlet(s) for the wastewater and return sludge (if any) in order to apportion the release of oxidative gas through the respective arrays in proportion or relation to the progressively reduced oxygen demand of the waste water as it moves further and further from the point of introduction in a given circuit around the channel.

It has been found that when the gas discharge means for the jumps includes one or more concentrated bubble diffusers and the bubble release means is a means for discharging fine bubbles, the second compressor, connected to the bubble release means, will usually be operating against a substantially higher back pressure than the first compressor. In general, the difference in back pressures will be at least about 1.3 psi, more commonly about 1.5 psi and preferably at least about 2 psi. As compared with a system in which the total air requirements for the gas discharge means and bubble release means would be a common compressor or battery of compressors, the compression of the air for the gas discharge means against a lower back pressure can result in considerable savings of energy.

When the hydraulic jump means comprises gas discharge means for inducing upward and forward motion of the wastewater, such gas discharge means can contribute to the overall oxygen transfer efficiency of the aerator. According to preferred embodiments of the invention the combined system oxygen transfer efficiency of the gas discharge means and bubble release means can be at least about 6, is more preferably at least about 7 and still more preferably is at least about 8.

Figure 12:
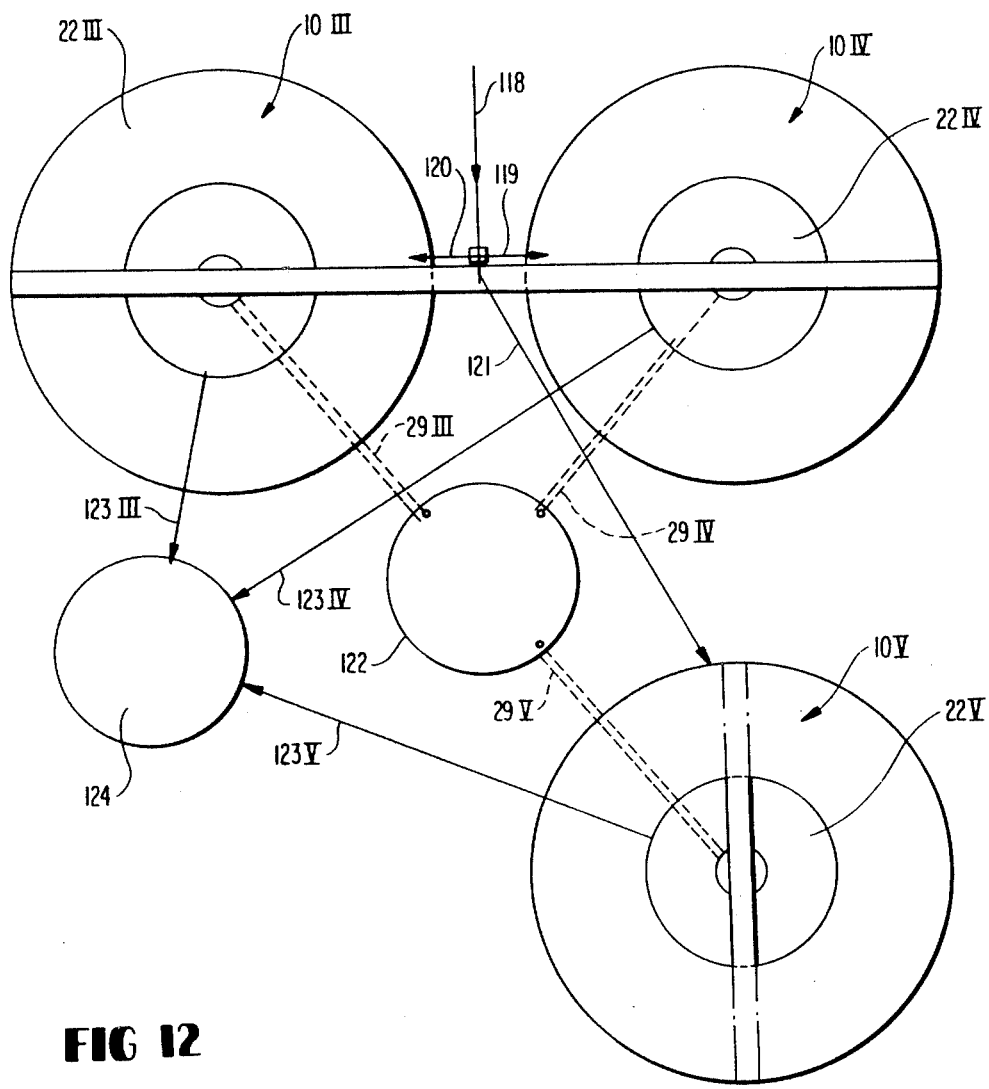
FIG. 12 is a schematic diagram showing three co-located ring channel aerators according to the invention along with their common sludge and effluent handling facilities.

In the construction of wastewater treatment plants incorporating the ring channel aerators of the present invention, one may provide a plurality of co-located aerators having common facilities for treating effluent sludge and wastewater. This is illustrated by FIG. 12. As shown in the figure, three co-located ring channel aerators 10III, 10IV, and 10V are supplied by raw sewage main 118 and branch sewage supply pipes 119, 120 and 121. These aerators include clarifiers being similar to those disclosed in FIGS. 1–5. The waste sludge lines 29III, 29IV and 29V of these aerator/clarifier combinations are connected to and feed into common sludge holding tank 122, from which the sludge may be delivered to a processing facility, a land fill or trucks for remote disposal. Effluent water lines 123III, 123IV and 123V from the respective clarifiers are all connected to, and deliver clarified water from the clarifiers to, a common treatment vessel 124 which may for instance be a post aeration unit, a chlorinator or a combination of post aeration and chlorination facilities or other suitable facilities for final treatment of the water.

Figure 13:
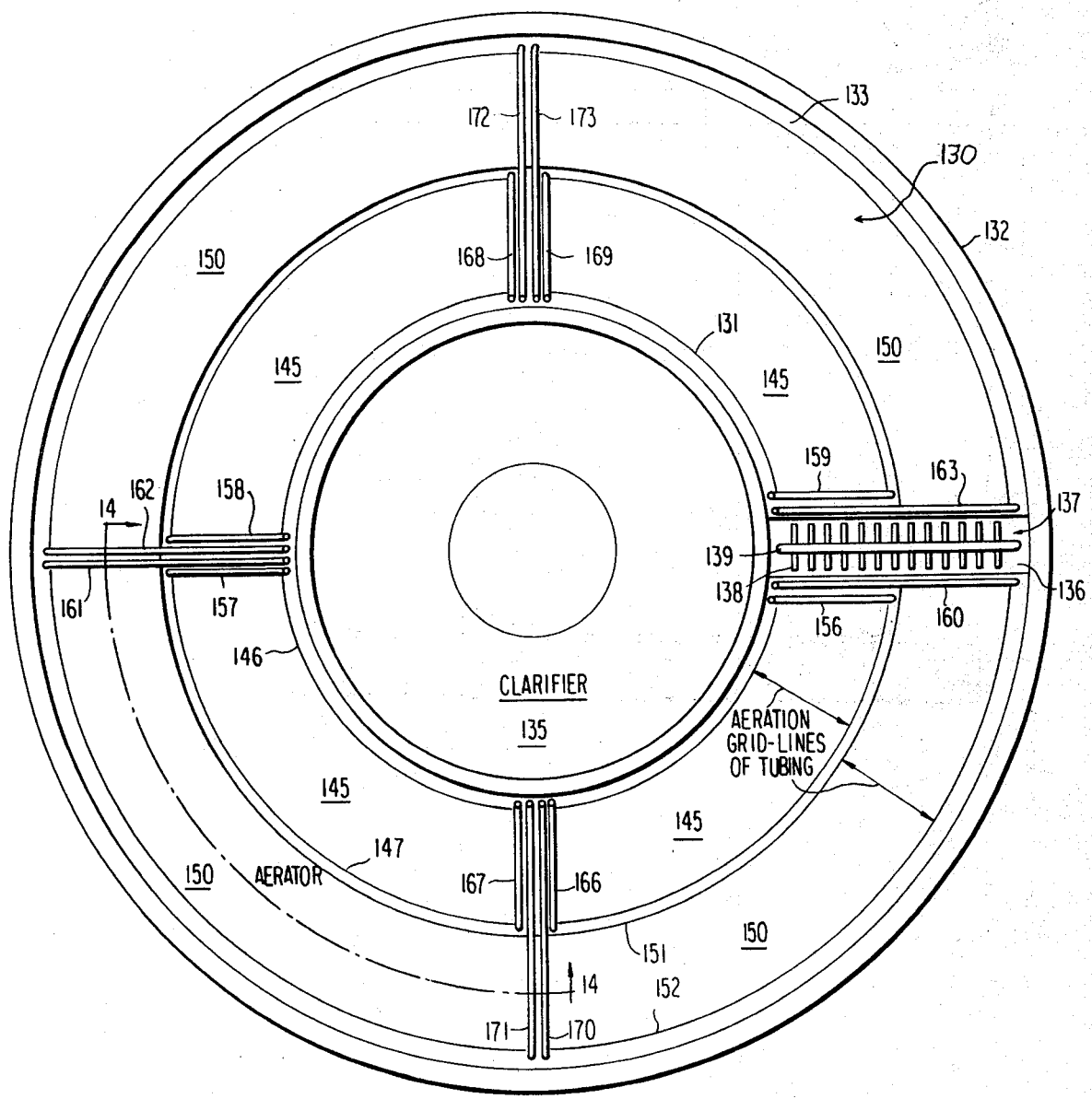
FIG. 13 is a schematic plan view of a modified version of the apparatus of FIG. 1, with portions removed, showing a cleaning and purging system for the horizontally non-propulsive bubble release means.
Figure 14:
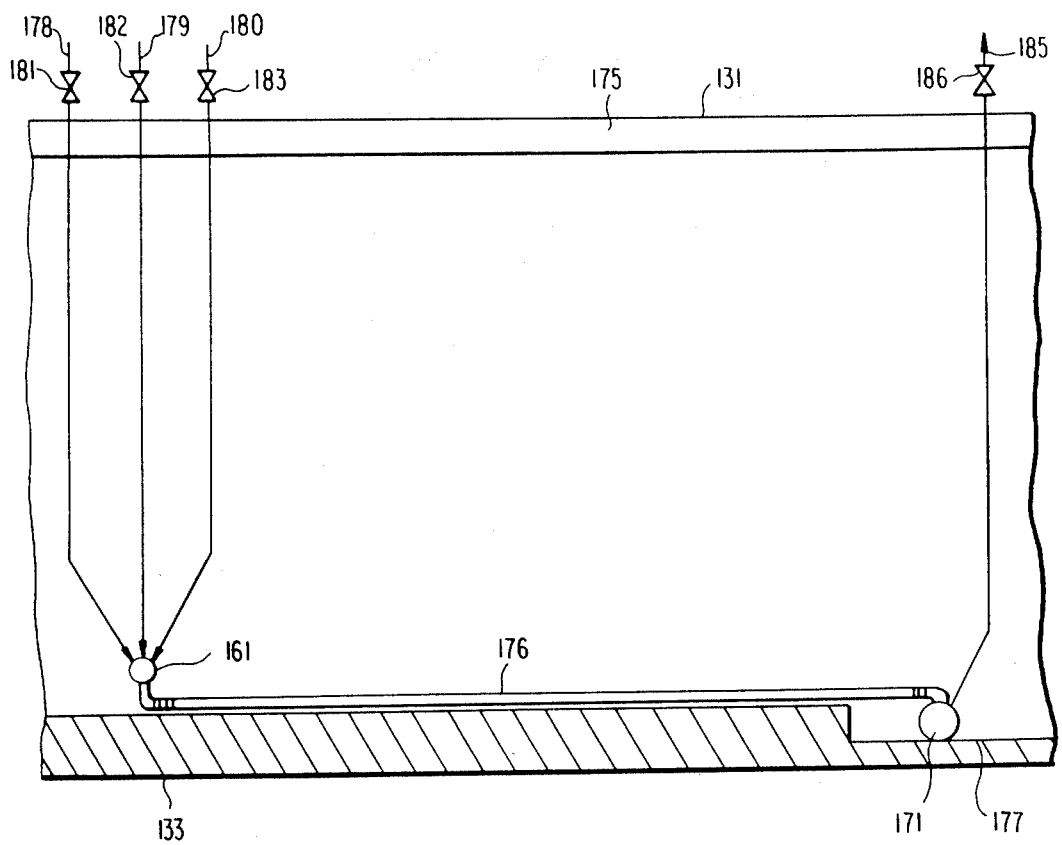
FIG. 14 is a schematic sectional view taken along section line 14—14 of FIG. 13.

FIGS. 13 and 14 disclose an embodiment of the invention having four aeration quadrants. It is otherwise similar in many respects to the embodiment shown in FIGS. 1–5, but parts have been removed to simplify the views, and means for flooding, purging and cleaning the hydraulic non-propulsive bubble release means have been added. In common with the FIGS. 1–5 embodiment, the ring channel aerator 130 of FIGS. 13 and 14 includes inner wall 131, outer wall 132, bottom wall 133 to define a circulation channel. The resultant channel is provided with all of the various accessory items disclosed in and utilized in the operation of the FIGS. 1–5 embodiment such as for example a wastewater inlet and a treated water outlet. Ring channel aerator 130 surrounds a clarifier tank 135, the outer wall of which is defined by inner wall 131 of the ring channel aerator. As in FIGS. 1–5, clarifier tank 135 includes the usual stilling well, scum trough, scum baffle, surface skimmer, effluent launder, sludge collector drive, sludge return, sludge divider, (not shown) from which sludge may be delivered to the usual sludge holding or disposal facilities (not shown).

The hydraulic jump means 136 of FIG. 13 is similar to that shown in FIGS. 1–5, except that the upstream water baffle of this embodiment (corresponding to baffle 39 of FIG. 3) does not include a "Y" wall. As in the embodiment of FIGS. 3–5, the FIGS. 13 and 14 embodiment includes chimney 137 having disposed within it gas discharge means, i.e. diffusers 138 arranged at spaced points across the width of chimney 137 and secured to either or both sides of propulsion air manifold 139 so that they are disposed horizontally and extend upstream and/or downstream (in relation to the general direction of flow in the ring channel aerator as a whole), approaching the walls of chimney 137 sufficiently closely to distribute bubbles throughout most of the length (distance between the upstream and downstream water baffles) of the chimney. The diffusers are of the general type disclosed in U.S. Pat. No. 3,424,343, supra. Suitable supply pipes are provided to conduct propulsion air to the propulsion air manifold 139.

As in FIGS. 1–5 the hydraulic non-propulsion bubble release means comprises a plurality of arrays of Lasaire TM flexible plastic tubing type diffusers. Each of the four quadrants of the channel in ring channel aerator 130 includes inner aeration grids 145 comprising lines of the above mentioned flexible tubing positioned between reference lines 146 and 147. Each such quadrant also includes outer aeration grids 150 lying between reference lines 151 and 152. Within each of such grids the lines of tubing are laid out upon equidistant circular lines generally concentric with the center of the circular clarifier and aeration channel, and are thus generally concentric with the aerator inner and outer walls 131 and 132.

Each of the inner and outer aeration grids is provided with its own individual gas manifold and drain manifold. Thus the four inner grids are provided with gas manifolds 156, 157, 158 and 159 while the outer grids are provided with gas manifolds 160, 161, 162 and 163, the respective gas manifolds being oriented radially relative to the center of inner and outer walls 131 and 132. At their radially inner ends the gas manifolds are connected with suitable headers (not shown) which in turn connect the manifolds with suitable pressure regulators, compressors and the like. The respective grids are also each supplied with individual drain manifolds including drain manifolds 166, 167, 168 and 169 for the inner grids and drain manifolds 170, 171, 172 and 173 for the outer grids.

FIG. 14 is a sectional view taken along section line 14—14 of FIG. 13, showing additional details concerning the mounting of the flexible tubing diffusers and their respective gas supply flooding, purging and cleaning means. In FIG. 14 it may be seen that inner wall 131 and bottom wall 133 in part define the channel and confine a circulating body of wastewater generally indicated by water surface line 175. The flexible tubing 176 of outer aeration grid 150 is disposed along its respective generally concentric layout line on the upper surface of bottom wall 133, having its inlet end connected to gas manifold 161 and an outlet end connected to drain manifold 171. Each of the respective drain manifolds in ring channel aerator 130 is mounted in a groove in bottom wall 133 such as the groove 177 which is of sufficient width to receive all four of the parallel and closely adjacent drain manifolds 170, 171, 172 and 173, the inner drain manifolds 166 and 167 as well as outer drain manifold 170 being omitted from FIG. 14 to simplify the view. The inner gas manifolds 157 and 158 as well as outer gas manifold 162, all of which extend closely adjacent and parallel to gas manifold 161 of FIG. 14, have also been omitted from the Figure to simplify it. The purpose of groove 177 and corresponding radially oriented grooves for the remaining drain manifolds is to provide the opportunity for gravity drainage of liquid from tubing 176 into the respective drain manifolds. In common with the other gas manifolds throughout FIG. 13 the gas manifold 161 of FIG. 14 is provided with a water supply line 178, gas supply line 179 and cleaning gas line 180 having, respectively, control valves 181, 182 and 183. In common with all of the drain manifolds throughout FIG. 13, drain manifold 171 of FIG. 14 is provided with a drain line 185 having a valve 186 to open or close the line.

In the normal operation of the ring channel aerator 130 of FIGS. 13 and 14 the control valves 181 and 183 for water supply line 178 and cleaning gas line 180 will be closed and valve 182 for the gas supply line 179 will be open. Also valve 186 and drain line 185 will be closed. An aeration gas such as air is supplied through gas supply line 179 and is bubbled into the water in the channel through minute circular or oval holes bored at spaced intervals along the crown of the tubing 176.

Normal operation of the system can result in the accumulation of water in the tubing 176, such as for example by condensation of water vapor contained in the compressed air supplied to the tubing. As this accumulation of water grows it can interfere with the proper distribution of air throughout the tubing system in the respective aeration grids. The drain manifold 171 provides a means for discharging such water accumulations while the plant is in operation. Accumulations of water in the drain manifolds may be discharged while the tubing system is under pressure by opening valve 186 in drain line 185, provided the pressure in the tubing system exceeds the hydrostatic head in drain line 185.

As is well known, extended operation of diffusers in wastewater frequently results in the formation of encrustations of organic and/or inorganic foulants at the gas discharge orifices of the diffusers. Such encrustations can not only interfere with proper distribution of the aeration gas and increase energy costs by increasing the back pressure in the system but may also tend to reduce the oxygen transfer efficiency of the system. For this reason it has been conventional practice to clean flexible tubing type diffusers with a cleaning gas on an intermittent basis to remove the said encrustations and restore the plant, insofar as possible, to its original back pressure, air distribution uniformity and oxygen transfer efficiency. For example HCl and other gases may be employed. The cleaning gas may be supplied to the system in admixture with the aeration gas, so that it is not necessary to reduce the pressure in the tubing below normal operating pressure during cleaning. In the present embodiment this may be accomplished by opening valve 183 in cleaning gas line 180 while aeration gas is still flowing through gas supply line 179 controlled by valve 182. If desired, the flow of cleaning gas can be completely substituted for the aeration gas by closing valve 182. The cleaning gas alone or in admixture with aeration gas enters manifold 161 passes through tubing 176 and discharges through the gas discharge orifices of the tubing thus removing the encrustations. At the completion of cleaning, it is desirable to maintain the tubing under gas pressure at all times, by appropriate manipulation of valves 182 and 183. Thus, for example, if aeration gas supply line 179 has been closed off by valve 182 during cleaning, the valve 182 should be opened as the cleaning gas line 180 is closed by valve 183, whereby normal operating pressure may be maintained within the tubing as the flow of cleaning gas is terminated. In general, it will be found that the cleaning gas will operate with greatest effectiveness if cleaning is preceded by the water purging operation described in the previous paragraph.

It has been found that termination of the flow of aeration gas through the tubing apertures, such as during a period of plant shut down for compressor or piping maintenance, can result in a flow of wastewater from the channel through the tubing apertures into the tubing. Such flow can deposit material in the apertures which impedes discharge of aeration gas when the plant is returned to operation. To prevent such occurrences it is recommended that the tubing be flooded with liquid that is substantially free of suspended solids at the time of shutdown and while there is still sufficient pressure in the tubing to prevent reverse flow of wastewater from the channel into the tubing. One may for example use non-potable water from a source within the wastewater treatment plant, which can be admitted to the tubing 176 by opening valve 181 while closing gas supply line 179, to keep the tubing under pressure provided the pressure available in water supply line 178 exceeds that in the gas manifold 161 and tubing 176. Then water will be back up in line 179. Valve 178 may be closed after flooding is complete. In order to complete the flooding of the tubing it may be necessary to open valve 186 of drain line 185 for a time in order to purge the system of air. Provided the valve 186 is not opened excessively, sufficient gas pressure may be maintained in the portions of the tubing which have not yet been flooded, thus inhibiting reverse flow of wastewater through the tubing apertures in those areas. After flooding is complete the valves 181, 182 and 186 may be closed.

During or after flooding, as above described, such as in a period of plant shut-down, or at any other time, the tubing may be flushed with non-potable water admitted through valve 181. For example, valves 181 and 186 may be opened sufficiently to cause a flow of non-potable water through line 181, gas manifold 161, tubing 176, drain manifold 171 and drain line 185 at a moderate pressure, e.g. not exceeding about 30 psi, and in a volume sufficient to provide a flow velocity at about 3 feet per second in tubing 176. Thus, debris can be flushed out of the tubing and discharged through drain manifold 171 and drain line 185. After flushing, any remaining flush water may be retained in the tubing for a time to keep the tubing flooded, or may be purged immediately. The water used to flood and flush the tubing may be purged in a manner described above.

In certain of the embodiments of the invention, such as for example that illustrated in FIG. 6, porous ceramic diffusion elements may be employed as the horizontal non-propulsive bubble release means. Such embodiments may also be provided with means for flooding, gas cleaning and purging in accordance with the general principles applicable to the FIGS. 13 and 14 embodiment. While gas cleaning of porous ceramic diffusion elements has been suggested at least as early as the 1930s in the literature of the wastewater treatment art, an especially effective, efficient and useful technique for gas cleaning such diffusion elements is disclosed in U.S. Pat. application Ser. Nos. 191,974 (now abandoned) and 203,834 now U.S. Pat. No. 4,382,867, filed Sept. 29, 1980 and Nov. 4, 1980, by Frank L. Schmit, Lloyd Ewing and David T. Redmon, now U.S. Pat. No. 4,382,867, issued May 10, 1983, the entire disclosures of which are hereby incorporated herein by reference.

Many variations of the apparatus are possible and, with the benefit of the prior description, can be readily formulated by persons skilled in the art without departing from the spirit of the invention. The process of the present invention can also be embodied in a wide variety of forms without departing from the spirit of the invention. Some of the possible variations are discussed below, it being understood that other variations may be made without departing from the spirit of the invention.

According to the invention, anaerobic conditions may be maintained in a portion of the channel. However, according to a particularly preferred embodiment, aerobic conditions are maintained substantially throughout the channel.

The attributes of the process are such that it is particularly attractive for ring channel aerators or colocated groups of ring channel aerators having a throughput of wastewater in the range of about 0.1 to 2 million gallons of throughput per day, and more preferably about 0.25 to about 1.5 gallons of plant throughput per day, per unit.

The process may be used in a wide variety of different types of applications. For example, the process may be employed in the aeration of industrial wastewater, which can vary quite widely in oxygen demand, and can also be used in the treatment of domestic sewage. For example, in a domestic sewage application, the wastewater may have an oxygen demand (including that required for nitrification, if any) of about 150 to about 250 or more ppm $BOD_5$, and the wastewater may be treated with about 1200 to about 4500 or more pounds of oxygen per million gallons of plant throughput per day. However, the invention is also readily applicable to wastewater having an oxygen demand of about 100 to about 300 or more ppm $BOD_5$ and to oxygen treatment of about 800 to about 5000 or more pounds of oxygen per million gallons of plant throughput per day. Much broader ranges of oxygen demand and oxygen treatment are possible and contemplated for use in the invention.

In most instances, the method of the invention will be operated as a multiple pass operation in which oxidative process gas addition, wastewater addition, return sludge addition, if any, and effluent water and sludge withdrawal are balanced to provide a desired degree of treatment in retention times in the range of about 12 to about 36 hours. One example of a level of treatment attainable in accordance with the invention is a reduction of pollutants in the wastewater to levels of about 30 ppm $BOD_5$ or less and about 30 ppm suspended solids or less. Another example is removal from the wastewater of at least about 90% of its initial $BOD_5$ and of at least about 90% of its initial suspended solids, and conversion to nitrate ion of substantially all of any ammonia which may have been present in the wastewater. The process may also be operated in such a manner as to accomplish the foregoing in a retention time in the range of about 15 to about 30 hours and more preferably about 18 to about 24 hours.

As noted above, the wastewater may be a mixed liquor of domestic sewage and return sludge. Without any intention of limiting the invention, it should be noted that the amount of return sludge may for example be in the range of about 25% to about 125% by volume of the influent water, and preferably about 40% to about 100% by volume of the influent wastewater.

According to a preferred embodiment of the invention, energy is applied to the wastewater in the propulsion zone or zones at the rate of about 0.5 to about 5 adiabatic horsepower per million gallons of daily flow of wastewater through the plant. Preferred and particularly preferred values of the foregoing, in terms of adiabatic horsepower per million gallons of daily flow of wastewater through the plant, are about 0.8 to about 3.5 and about 1 to about 3.

The circulation rate induced in the wastewater by causing the upward and forward motion, as aforesaid, may vary considerably. While a given circulation rate may be selected in relation to the desired retention time, it may also be influenced by suspended solids, if such are present. Different wastewaters may or may not have significant quantities of suspended solids in the wastewaters themselves or in the aerated wastewaters. For example, domestic sewage and mixed liquors composed of domestic sewage and return sludge have substantial quantities of suspended solids. The process is preferably conducted while maintaining the majority of the solids in suspension until they are removed from the channel.

According to one preferred embodiment of the method, sufficient energy is imparted to the wastewater in the propulsion zone or zones to form a wave in the wastewater as it exits said zone(s). Preferably the energy is sufficient to form a continuation of the rolling motion downstream of said zone(s) for creating currents in the wastewater that roll forward, downward, rearward and upward. Such currents can extend retention of oxidative process gas bubbles and assist in flocculation of suspended solids in the waste water.

As indicated above, it is preferred to induce an upward and forward rolling motion in the channel by discharge of gas in the propulsion zone or zones. Preferably the gas is discharged at the rate of about 2 to about 3 SCFM per foot of side to side width inside of the propulsion zone(s).

In the practice of the method, the rate of flow of gas into the propulsion zone(s) may be varied independently of the rate of flow of oxidative process gas through the bubble release means, and vice versa.

According to the method of the present invention, a specified ratio is maintained between the adiabatic horsepower consumed in inducing circulation and the total of said horsepower plus the adiabatic horsepower consumed in nonpropulsive bubbling of process gas into the wastewater. Preferred and particularly preferred ranges for said ratio are about 0.02 to about 0.25 and about 0.03 to 0.2.

According to a preferred embodiment of the invention, the oxidative process gas may be introduced into the channel at a rate of about 10 SCFM or less per thousand cubic feet of liquid volume. Preferably said rate may be about 8 SCFM or less. The liquid volume referred to herein may be the liquid volume of the entire channel; alternatively, the liquid volume may be the volume of liquid above that portion of the floor of the channel over which the bubble release means is distributed.

A particularly preferred form of the invention provides flexible allocation of horsepower consumption between circulation and aeration circulation at a rate of less than about one foot per second as described above. According to this embodiment about 0.5 to about 5 adiabatic horsepower are applied, per million gallons of daily plant throughput, for inducing circulation, while the rate of release of oxidative process gas is varied in response to the BOD of the wastewater and independently of the rate of discharge of gas through a gas discharge means which is used for inducing the circulation in a propulsion zone or zones. Simultaneously with the foregoing, the ratio of the foregoing horsepower, relative to the total of said horsepower plus the adiabatic horsepower consumed in non-propulsive bubbling of process gas into the wastewater, is maintained in the range of about 0.01 to about 0.3, more preferably about 0.02 to about 0.25 and most preferably about 0.03 to about 0.3.

ADVANTAGES

Provision of a ring channel aerator with horizontally non-propulsive bubble release means and hydraulic jump means for inducing circulation—and possibly also flocculation—enables one to separate the major portion of the work involved in the aeration of the wastewater from the work of circulating the wastewater; thus unlike aerating systems combining the functions of aeration and circulation, one need not employ excessive quantities of energy for circulation and/or mixing in order to obtain the requisite degree of aeration and vice versa.

Where the energy released in the propulsion zone or zones is released by means of a gas discharge means and the bubble release means is a means for releasing fine bubbles, the gas for the gas discharge means may be compressed against a lower back pressure than the gas for the bubble release means, resulting in substantial savings of energy.

Where the design of the ring channel aerator is such that it takes less energy to keep the channel contents in motion than to commence circulation, the amount of energy allocated to circulation may be reduced once circulation is established—without affecting or impairing the operation of the bubble release means through which the oxidative process gas is released.

Separate controllability of the consumption of energy in the propulsion zone or zones as opposed to the remainder of the flow path (in which the horizontally non-propulsive bubble release means is operated) makes it possible to operate the plant in different modes to accomplish different results. Thus, for example, one may change the wastewater (e.g. mixed liquor) from aerobic to anaerobic, and then back to aerobic, such as for example might be employed in nitrification/denitrification. In systems with multiple hydraulic jumps, it may be possible to obtain some adjustment in the dwell time in the successive portions of the flow path between the jumps, by adjusting the relative rates of energy release in the respective jumps.

The invention makes possible highly efficient aeration, not only in shallow channels, but also in deeper channels, such as for instance those about 10 to 20 feet deep in which it has been found possible to operate with reduced energy consumption and/or increased oxygen transfer efficiency as compared with ring channel aerators using rotating brushes, rotating paddles or ejectors as the sole circulation and aeration means.

Aeration in an activated sludge sewage treatment plant involves three functions: transfer of oxygen into the liquid being treated; mixing of the tank contents; and flocculation of the fines to promote better settling in a clarifier. Porous plates, domes and other types of aeration devices all have their particular strengths and weaknesses, but the present invention provides a hydraulic jump which can do the major portion of the mixing and flocculation, while a separate bubble release means does the major part of the work of aeration. The combined result is a particularly efficient attainment of the above mentioned three functions, as compared to many other aeration devices.

Moreover, when circulation is induced by gas discharge means in the propulsion zone or zones, such gas may be oxidative gas which adds oxygen to the channel contents. This increases the available oxygen transfer efficiency, as compared to that available from the bubble release means alone.

Other advantages of the invention will be apparent to those skilled in the art from the foregoing disclosure of the invention and from experience with its operation.

DEFINITIONS

Wastewater—water containing domestic sewage, industrial waste or other pollutants which can be ameliorated in or removed from the water by treatment which includes aeration.

Aeration—introducing oxidative gas such as air, oxygen enriched air, oxygen, ozone or other gas capable of providing oxygen for reaction with pollutants in wastewater.

Circulation—movement around a circuit in such a way as to repetitively return to and pass by a given point on said circuit.

Ring channel—an open- or closed-top channel, conduit or other liquid carrying means having wall means which, as viewed in plan view, are laid out in a circular, oval, ellipsoidal, serpentine or other shape for guiding wastewater in a circuit during circulation.

Concentrated bubble diffuser—a bubble release device adapted to release oxidative gas into wastewater through apertures arrayed in said bubble release device in a group containing a sufficient number of apertures to release oxidative gas at the rate of at least about 0.05 SCFM per square inch of the horizontal projected area of said group.

Fine bubble diffuser—a diffuser which produces an array of bubbles in which those bubbles representing the major portion of the total volume of all bubbles in the array exhibit an average rise rate of about 0.8 foot per second or less while rising in said wastewater.

Adiabatic horsepower (H.P.)—the horsepower consumed in compressing air in a pump (e.g. compressor) and discharging same under water through an air discharging device such as an aerator, as determined in accordance with the formula:

$$\text{H.P.} = 0.226Q\left[\left(\frac{P_2}{P_1}\right)^{0.283} - 1\right]$$

where Q=volume air rate (SCFM), $P_2$=pump outlet pressure (psia), and $P_1$=pump inlet pressure (psia).

Oxygen transfer efficiency (O.T.E.)—the pounds of oxygen absorbed in clear water under standard conditions (20° C., zero dissolved oxygen, sea level barometric pressure) per horsepower hour. In determination of the O.T.E. of a complete aerating system, all horsepower consumed by the system for inducing movement of the wastewater and for discharging air into the water is considered, but adiabatic horsepower is used in the calculation for all aerating devices whether employed for non-propulsive bubble release and/or for inducing circulation of the wastewater. In determination of the O.T.E. of an aerating device or group of such devices, only the horsepower (adiabatic) consumption of the device or devices is considered.

Horizontally non-propulsive—as applied to one or more bubble release means in a ring channel, signifies that such bubble release means, collectively, are unable to produce a net horizontal velocity as great as 0.3 or 0.1 feet per second in the wastewater, averaged over a longitudinal cross-section or sections of the channel passing through the bubble release means.

Substantially upright—as applied to the baffle means of a hydraulic jump means, indicates on the average more nearly vertical than horizontal.

In—as applied to gas discharge means, includes within, extending into or on.

Induced—caused, commenced and maintained, or merely maintained.

The invention is illustrated by the following nonlimiting example:

EXAMPLE

An oval ring channel aerator was constructed with vertical side walls and a flat bottom to accommodate a normal water depth of 10.5 feet, which could vary from 8 to 12 feet. The channel comprises two parallel straight sections 24 feet wide by 78 feet long, positioned side by side, and separated by a 1 foot thick common inner wall of the same length. Two semi-circular continuations of the outer walls each having 24.5 foot radii join both ends of the outer walls of the straight sections to one another to form an oval racetrack flow path having a length of about 233 feet, a liquid capacity at the 10.5 feet depth of about 440,000 gallons and a nominal ultimate capacity of about 500,000 gallons.

A hydraulic jump extends perpendicularly from each side of the central dividing wall at its mid-point, extending across the entire width of the two straight sections of the channel so that all of the liquid which makes a complete pass around the channel must pass through both jumps. Each jump includes upstream and downstream water baffles each extending across the entire width of the channel and having no wastewater passageways other than the inlets and outlets described below. The two jumps, including their respective baffles occupy approximately 4% of the flow path. The inlet of each jump is 3.5 feet high throughout its width, and its bottom coincides with the channel floor. The sides of the inlets, chimneys and outlets of both jumps coincide with the side walls of the straight sections of the channel and are thus each 24 feet wide. The bottoms of the outlets are 7 feet above floor level and extend above the intended water line of the body of wastewater to be treated in the plant.

For gas discharge means each jump is provided with eight (8) Sanitaire D-24 stainless steel coarse bubble diffusers mounted at approximately equal intervals of distance from one another across the width of each chimney with the diffusers in a horizontal plane at approximately the same elevation as the top of the chimney inlet and extending generally parallel to the direction of the overall flow in the channel. Half of the foregoing distance separates the end diffusers from the adjacent chimney side walls. The upstream ends of the twenty-four inch long diffusers are connected to manifolds running horizontally across the inner surfaces of the upstream water baffles so that their upstream ends are 6 inches downstream from these inner walls. Thus the diffuser downstream ends are located 14 inches from the inner surfaces of the downstream water baffles. The 16 diffusers (total) in the two jumps are connected to a blower adapted to produce 160 SCFM.

As hydraulic non-propulsive bubble release means approximately 7600 feet of the above described Lasaire™ flexible tubing is secured to the bottom wall of the channel in straight lines parallel to the center dividing wall. Air headers are secured perpendicular to the direction of liquid flow in the channel and at floor level closely adjacent to the upstream and downstream ends of the jumps. The uniformly spaced apart lines of tubing extend perpendicularly from these headers throughout all four of the racetrack quadrants into which the oval racetrack is divided by the two jumps and the central dividing wall. Extending in unbroken straight lines from the respective headers, the lengths of tubing terminate adjacent the semi-circular end walls to which they are secured in groups of five by suitable tensioners. Through respective headers and suitable valving arrangements, these tubes, averaging about 49 feet in length, are provided with selectable connection to either or both of two blowers each capable of producing 275 SCFM.

The channel was filled to a depth of 10 feet with clear water, air was supplied to the diffusers in the jumps at a blower output pressure of 2.3 psi, delivering about 3.1 SCFM of air to each jump per foot of jump width. The flexible tubing type diffusers were supplied with air through one of the two 275 SCFM blowers at a blower output pressure of 6.1 psi. Satisfactory operation of the jumps ensued, resulting in positive displacement circulation of the channel contents at an average velocity of about 0.3 to about 0.4 feet per second.

Into the plant was introduced a 300,000 gallons per day flow of wastewater believed to comprise the following proportions of liquid flow:

|  | Percent |
| --- | --- |
| Domestic sewage | 68 |
| Effluent from transformer plant | 5 |
| Effluent from creamery | 4 |
| Infiltration | 23 |
|  | 100 |

It is estimated that the organic load (BOD$_5$) in the above flow was divided approximately as follows:

|  | Percent |
|---|---|
| Domestic | 64 |
| Transformer Company | 3 |
| Creamery | 33 |
|  | 100 |

Over a three day period of operation at 50° F. the BOD$_5$ (Raw-Composite) of the incoming wastewater varied from 350 to 1550 with an average of 934 pounds per day. The plant was operated as described above, except that during the eight hours of heaviest load on week days (Monday through Friday) both of the 275 SCFM aeration air blowers were operated. The average BOD$_5$ removal was 888 pounds per day, leaving only 46 pounds per day in the 300,000 gallons per day of effluent, i.e. 18 ppm. Dissolved oxygen levels in the channel were in the range of 1 to 4.2 ppm. Grab samples of effluent showed suspended solids levels ranging from one to 24 mg/l, averaging about 10 mg/liter. Delivery of 160 SCFM of air at 2.3 psi to the jumps consumed 37.5 adiabatic horsepower hours per day. Delivery of 275 SCFM and 550 SCFM for aeration for the indicated periods consumed an average of 210 adiabatic horsepower hours per day for a total horsepower of 247.5. The propulsion horsepower (i.e. energy utilized in the jumps) represented 15% of the total, and 3.59 pounds of BOD were removed per adiabatic horsepower hour.

What is claimed is:

1. In a ring channel aerator comprising inner and outer wall means for circulating waste water along a horizontal flow path, the improvement which comprises:

means for causing the major portion of the work expended in the aeration of the waste water to be performed separately from the work of circulating said waste water, said means including:

hydraulic jump means located in said channel and extending between said inner and outer wall means generally transversely of said flow path for inducing an upward and forward motion in the waste water as it passes through and out of said jump, said hydraulic jump means comprising a substantially upright chimney member having an upstream inlet in the lower half of the channel depth and a downstream outlet in the upper half of the channel depth, said hydraulic jump means having the property that it is capable of imparting and maintaining horizontal circulation of waste water within said ring channel aerator with an energy expenditure of about 0.35 times the total energy input to the ring channel aerator or less, said hydraulic jump means occupying a minor portion of the length of said flow path; and horizontally non-propulsive bubble release means positioned along the remainder of said flow path for bubbling oxidative process gas into the waste water and having an oxygen transfer efficiency of at least about 6.

2. An apparatus according to claim 1 wherein the ratio of the flow path length measured along the center line of the channel, relative to the average width of the channel measured throughout the height of its transverse cross-section at and below the normal operating water level is at least about 5.

3. An apparatus according to claim 1 wherein the ratio of the flow path length measured along the center line of the channel, relative to the average width of the channel measured throughout the height of its transverse cross-section at and below the normal operating water level is in the range of about 5 to about 15.

4. An apparatus according to claim 1 wherein the ratio of the flow path length measured along the center line of the channel, relative to the average width of the channel measured throughout the height of its transverse cross-section at and below the normal operating water level is in the range of about 8 to about 10.

5. An apparatus according to claim 1 wherein the average depth of said ring channel, measured from the bottom of the channel to its normal operating water line is at least about 5 feet.

6. An apparatus according to claim 1 wherein the average depth of said ring channel, measured from the bottom of the channel to its normal operating water line is in the range of about 5 to about 20 feet.

7. An apparatus according to claim 1 wherein the average depth of said ring channel, measured from the bottom of the channel to its normal operating water line is in the range of about 10 to about 20 feet.

8. An apparatus according to claim 1 wherein the average depth of said ring channel, measured from the bottom of the channel to its normal operating water line is in the range of about 12 to about 15 feet.

9. An apparatus according to claim 1 wherein the ring channel is of uniform depth throughout.

10. An apparatus according to claim 1 wherein said ring channel is substantially free of obstructions to flow other than said hydraulic jump means.

11. An apparatus according to claim 1 wherein said channel is of circular configuration in plan view.

12. An apparatus according to claim 1 wherein said inner and outer walls are both circular when viewed in plan view.

13. An apparatus according to claim 1 wherein said inner and outer walls are substantially equidistant throughout.

14. An apparatus according to claim 1 wherein said inner wall is substantially vertical.

15. An apparatus according to claim 1 wherein said channel is further defined by bottom wall means connected with said inner and outer wall means.

16. An apparatus according to claim 15 wherein said bottom wall means is substantially horizontal.

17. An apparatus according to claim 1 wherein said ring channel includes a waste-water inlet closely adjacent to and upstream of said hydraulic jump means.

18. An apparatus according to claim 1 wherein said ring channel includes a return sludge inlet closely adjacent to and upstream of said hydraulic jump means.

19. An apparatus according to claim 1 wherein said ring channel includes a waste-water inlet and an effluent outlet which is more nearly upstream of said wastewater inlet than downstream thereof.

20. An apparatus according to claim 1 wherein said substantially upright chimney member extends for substantially the entire depth of said channel between its bottom and the normal operating water line of the channel, said downstream outlet of said chimney being defined at least in part by a member defining a sufficiently abrupt change in cross-section from said chimney outlet to the full cross-section of the channel for causing water which exits the chimney outlet to whirl or roll about a generally horizontal axis transverse to said flow path.

21. An apparatus according to claim 20 wherein said chimney is defined by substantially vertical wall means.

22. An apparatus according to claim 20 wherein the bottom of said inlet is at substantially the same elevation as the bottom of the channel.

23. An apparatus according to claim 20 wherein said outlet extends from beneath the water surface to an elevation at or above the water surface in said channel.

24. An apparatus according to claim 20 wherein the inlet, chimney and outlet each has a cross-sections measured normal to the direction of flow in the range of about 0.2 to about 0.5 of the transverse cross-sectional area of the channel at and below its normal operating water line, averaged along the entire length of said flow path.

25. An apparatus according to claim 20 wherein the inlet, chimney and outlet each has a cross-sections measured normal to the direction of flow in the range of about 0.25 to about 0.4 of the transverse cross-sectional area of the channel at and below its normal operating water line, averaged along the entire length of said flow path.

26. An apparatus according to claim 20 wherein the inlet, chimney and outlet each has a cross-sections measured normal to the direction of flow in the range of about 0.3 to about 0.37 of the transverse cross-sectional area of the channel at and below its normal operating water line, averaged along the entire length of said flow path.

27. An apparatus according to claim 20 wherein said inlet, chimney and outlet are all of similar cross-section measured normal to the direction of flow.

28. An apparatus according to claim 20 wherein said inlet, the interior of the chimney and said outlet are of substantially the same width as those portions of the channel which are closely adjacent to and both upstream and downstream of said chimney.

29. An apparatus according to claim 20 wherein said change in cross-section is sufficiently abrupt to create sufficiently vigorous rolling action for assisting in flocculation of solids suspended in waste-water.

30. An apparatus according to claim 20 wherein said change in cross-section is sufficiently abrupt to create sufficiently vigorous rolling action for entraining bubbles of oxidative gas in the rolling water and thereby prolonging their contact therewith.

31. An apparatus according to claim 20 wherein upward propulsion means is positioned in said chimney for imparting energy in an upward direction to the contents of the chimney.

32. An apparatus according to claim 31 wherein said upward propulsion means is positioned for distributing said energy across substantially the entire width of said chimney with sufficient uniformity of distribution for causing said upward and forward motion to occur across substantially the entire width of said chimney.

33. An apparatus according to claim 31 wherein said chimney is defined at least in part by an upstream upper water baffle and a downstream lower water baffle.

34. An apparatus according to claim 33 wherein said upward propulsion means is positioned in the longitudinal space between the upper water baffle and the lower water baffle.

35. An apparatus according to claim 20 wherein gas discharge means is positioned in said chimney for imparting upward motion to the contents of the chimney.

36. An apparatus according to claim 35 wherein said gas discharge means is positioned for distributing bubbles across the width of said chimney with sufficient uniformity of distribution for causing said upward and forward rolling action to occur across substantially the entire width of said chimney.

37. An apparatus according to claim 35 wherein said chimney is defined at least in part by an upstream upper water baffle and a downstream lower water baffle.

38. An apparatus according to claim 37 wherein said gas discharge means is positioned for distributing said gas across more than half of the horizontal distance between the upstream and downstream water baffles.

39. An apparatus according to claim 37 wherein said gas discharge means is positioned for distributing said gas across substantially the entire distance between the upstream and downstream water baffles.

40. An apparatus according to claim 37 wherein said gas discharge means is positioned on the upper water baffle.

41. An apparatus according to claim 37 wherein said gas discharge means has gas discharge outlets whose level of submergence is equal to at least half the depth of the upper water baffle, measured downward from the normal operating water line of the channel.

42. An apparatus according to claim 37 wherein said gas discharge means is positioned at about the same elevation as the lower edge of the chimney inlet.

43. An apparatus according to claim 35 wherein said gas discharge means is a plurality of gas diffusers distributed at spaced intervals across said chimney.

44. An apparatus according to claim 43 wherein the projected area of said gas diffusers covers not more than about 25% of the lineal distance from side to side of the interior of said chimney.

45. An apparatus according to claim 43 wherein said gas diffusers are concentrated bubble diffusers.

46. An apparatus according to claim 45 wherein said concentrated bubble diffusers have an oxidative gas discharge rate of about 0.05 to about 0.5 SCFM per square inch.

47. An apparatus according to claim 45 wherein said concentrated bubble diffusers have an oxidative gas discharge rate of about 0.1 to about 0.3 SCFM per square inch.

48. An apparatus according to claim 1 wherein said hydraulic jump means comprises a pluality of hydraulic jumps at spaced locations along said flow path.

49. An apparatus according to claim 48 wherein said plurality of hydraulic jumps is positioned at equally spaced locations along said flow path.

50. An apparatus according to claim 1 wherein said hydraulic jump means occupies about 10% or less of the length of said flow path, measured along the center line of said channel.

51. An apparatus according to claim 1 wherein said bubble release means occupies at least about 40% of the length of the flow path, measured along the centerline of said channel.

52. An apparatus according to claim 1 wherein said bubble release means occupies at least about 60% of the length of the flow path, measured along the centerline of said channel.

53. An apparatus according to claim 1 wherein said bubble release means occupies at least about 90% of the length of the flow path, measured along the centerline of said channel.

54. An apparatus according to claim 1 wherein said bubble release means occupies substantially the entire flow path outside said hydraulic jump means.

55. An apparatus according to claim 1 wherein said bubble release means is distributed over at least about 40% of the floor area of the channel.

56. An apparatus according to claim 1 wherein said bubble release means is distributed over at least about 60% of the floor area of the channel.

57. An apparatus according to claim 1 wherein said bubble release means is distributed over at least about 90% of the floor area of the channel.

58. An apparatus according to claim 1 wherein said bubble release means is distributed over substantially the entire area of the floor of said channel outside said hydraulic jump means.

59. An apparatus according to claim 1 wherein said bubble release means comprises plural arrays of diffusers, each such array comprising a plurality of diffusers having a common supply conduit.

60. An apparatus according to claim 59 wherein said diffusers are capable of emitting oxidative process gas in a form and amount sufficient for satisfying the aeration requirements for treatment to a 90% removal of $BOD_5$ and suspended solids at a retention time in the range of about 18 to 24 hours.

61. Apparatus according to claim 60 wherein said diffusers are not capable of emitting oxidative process gas in a form and amount sufficient to mix the wastewater adequately to prevent sedimentation.

62. An apparatus according to claim 59 wherein at least some of said arrays have separately controllable oxidative process gas supplies connected to their supply conduits.

63. An apparatus according to claim 62 wherein said separately controllable oxidative process gas supplies include means for adjusting certain of said arrays to higher rates than other arrays in respect to rate of oxidative process gas release, per unit area of channel floor.

64. An apparatus according to claim 62 wherein said separately controllable oxidative process gas supplies include means for preventing release of oxidative process gas from a portion of said arrays while other arrays are in operation.

65. An apparatus according to claim 59 wherein said arrays are closely spaced to cover substantially the entire area of the floor of said channel outside said hydraulic jump means.

66. An apparatus according to claim 59 wherein said bubble release means includes apertured tubing.

67. An apparatus according to claim 59 wherein said bubble release means includes means for discharging fine bubbles.

68. An apparatus according to claim 67 wherein said means for discharging fine bubbles includes ceramic plate diffusers.

69. An apparatus according to claim 67 wherein said means for discharging fine bubbles comprises apertured tubing.

70. An apparatus according to claim 59 wherein said diffusers are apertured tubing type diffusers laid in segmented circular patterns which generally follow and extend along said flow path.

71. An apparatus according to claim 59 wherein said arrays include generally radially disposed horizontal supply conduits, horizontal headers arranged generally perpendicular to said supply conduits, and ceramic plate diffusers arranged at spaced locations along said headers.

72. An apparatus according to claim 1 wherein said apparatus comprises a first power means connected to said hydraulic jump means for supplying energy thereto for inducing said upward and forward motion in said wastewater, and separate second power means connected to said horizontally non-propulsive bubble release means for supplying energy thereto for bubbling oxidative process gas into said wastewater.

73. An apparatus according to claim 72 wherein said first power means comprises a compressor and motor.

74. An apparatus according to claim 72 wherein said second power means comprises a compressor and motor.

75. An apparatus according to claim 72 wherein said first and second power means respectively comprise compressors and motors.

76. An apparatus according to claim 72 wherein said first and second power means are separately controllable whereby the volume of oxidative process gas released through said horizontally non-propulsive bubble release means may be reduced or increased as required by corresponding reductions and increases in the oxygen demand of said wastewater without requiring corresponding reductions or increases in the energy supplied through said hydraulic jump means for circulation.

77. An apparatus according to claim 72 wherein the energy supply capacity of the second power means, as installed in said apparatus, is sufficiently large in relation to the energy supply capacity of said first power means, for causing said second power means to supply the major portion of the total energy supplied by said first and second power means both for inducing said motion and for discharging oxidative process gas through said bubble release means.

78. An apparatus according to claim 77 wherein said first power means comprises a compressor and motor.

79. An apparatus according to claim 77 wherein said second power means comprises a compressor and motor.

80. An apparatus according to claim 77 wherein said first and second power means respectively comprise compressors and motors.

81. An apparatus according to claim 77 wherein said hydraulic jump means comprises gas discharge means for inducing upward and forward motion of said wastewater, said first power means being a first compressor and motor connected to said gas discharge means and said second power means being a second separate compressor and motor connected with said horizontally non-propulsive bubble release means.

82. An apparatus according to claim 81 wherein said gas discharge means includes a concentrated bubble diffuser and said bubble release means is a means for discharging fine bubbles and said second compressor is connected for operating against a substantially higher pressure than said first compressor.

83. An apparatus according to claim 82 wherein the difference in back pressures is at least about 1.3 PSI.

84. An apparatus according to claim 82 wherein the difference in back pressures is at least about 1.5 PSI.

85. An apparatus according to claim 82 wherein the difference in back pressures is at least about 2 PSI.

86. An apparatus according to claim 1 wherein said hydraulic jump means comprises gas discharge means for inducing upward and forward rolling motion of said wastewater, and wherein the combined system oxygen transfer efficiency of said gas discharge means and bubble release means is at least about 6.

87. An apparatus according to claim 1 wherein said hydraulic jump means comprises gas discharge means for inducing upward and forward rolling motion of said wastewater, and wherein the combined system oxygen transfer efficiency of said gas discharge means and bubble release means is at least about 7.

88. An apparatus according to claim 1 wherein said hydraulic jump means comprises gas discharge means for inducing upward and forward rolling motion of said wastewater, and wherein the combined system oxygen transfer efficiency of said gas discharge means and bubble release means is at least about 8.

89. An apparatus according to claim 1 wherein said inner wall encloses a clarifier, said channel having a return sludge inlet from said clarifier and, upstream of said return sludge inlet, a mixed liquor transfer conduit for transferring mixed liquor from said channel to said clarifier.

90. A plurality of co-located ring channel aerators according to claim 1.

91. An apparatus according to claim 90 wherein said ring channel aerators each enclose a clarifier and the respective clarifiers are connected to a common sludge tank and common liquid post treatment facilities.

92. An apparatus according to claim 90 wherein said ring channel aerators are each provided with gas discharge means in their respective hydraulic jump means and wherein said gas discharge means are connected to a common compressor means and said horizontally non-propulsive bubble release means are connected to a separate common compressor means and wherein the respective common compressor means are separately controllable.

93. In a ring channel aerator comprising inner and outer wall means for circulating wastewater along a horizontal flow path, the improvement which comprises:
means for causing the major portion of the work expended in the aeration of the wastewater to be performed separately from the work of circulating said wastewater, said means including:
hydraulic jump means located in said channel and extending between said inner and outer wall means generally transversely of said flow path, said hydraulic jump means including means for establishing upward flow in said jump, for positively urging said flow in a forward direction as it departs said jump, for discharging said forward flowing wastewater from said jump as a stream which includes the upper surface of the wastewater downstream of the jump, for directing said stream into a zone of abruptly increased cross-section immediately downstream of the jump and for inducing thereby a forward roll in the wastewater, said hydraulic jump means comprising a substantially upright chimney member having an upstream inlet in the lower half of the channel depth and a downstream outlet in the upper half of the channel depth, said hydraulic jump means having the property that it is capable of imparting and maintaining horizontal circulation of wastewater within said ring channel aerator with an energy expenditure of about 0.35 times the total energy input to the ring channel aerator or less, said hydraulic jump means occupying a minor portion of the length of said flow path; and
horizontally non-propulsive bubble release means positioned along the remainder of said flow path for bubbling oxidative process gas into the waterwater and having an oxygen transfer efficiency of at least about 6.

94. In a ring channel aerator comprising inner and outer wall means for circulating wastewater along a horizontal flow path, the improvement which comprises:
means for causing the major portion of the work expended in the aeration of the wastewater to be performed separately from the work of circulating said wastewater, said means including:
hydraulic jump means located in said channel for inducing an upward and forward rolling motion in the wastewater as it passes through and out of said jump, said hydraulic jump means having the property that it is capable of imparting and maintaining horizontal circulation of wastewater within said ring channel aerator with an energy expenditure of about 0.35 times the total energy input to the ring channel aerator or less, said hydraulic jump means occupying a minor portion of the length of said flow path and comprising:
an upstream upper water barrier and a downstream lower water barrier, said barriers extending between said inner and outer walls and generally transversely of said flow path;
an upstream inlet and downstream outlet positioned respectively below and above said upstream and downstream water barriers;
gas discharge means distributed laterally between said inner and outer walls in the space between said upstream and downstream barriers, said gas discharge means being positioned for releasing and distributing its discharge of gas across more than half of the horizontal distance between said upstream barrier and said downstream barrier; and
horizontally non-propulsive bubble release means positioned along the remainder of said flow path for bubbling oxidative process gas into the wastewater and having an oxygen transfer efficiency of at least about 6.

95. An apparatus according to claim 94 in which the said gas is distributed over substantially the entire horizontal distance between said barriers.

96. A method of aerating wastewater undergoing circulation in a ring channel along a horizontal flow path, comprising:
inducing said horizontal circulation by causing upward and forward motion of the wastewater as it passes through and exits at least one propulsion zone, said zone or zones being located in and extending transversely of said flow path, and occupying a minor portion of the length of said flow path, said zone or zones comprising a substantially upright chimney member(s) having an upstream inlet and a downstream outlet at a relatively higher elevation than said inlet;
bubbling oxidative process gas into the wastewater along said flow path outside said propulsion zone(s) through horizontally non-propulsive bubble release means having an oxygen transfer efficiency of at least about six; and
maintaining a ratio in the range of about 0.01 to about 0.35 between the adiabatic horsepower consumed in inducing said circulation and the total of said horsepower plus the adiabatic horsepower consumed in non-propulsive bubbling of process gas into the wastewater.

97. A method according to claim 96 wherein said oxidative process gas is air.

98. A method according to claim 96 wherein said wastewater is a mixed liquor of domestic sewage and return sludge.

99. A method according to claim 98 wherein the amount of return sludge is in the range of about 25% to about 125% by volume of the influent wastewater.

100. A method according to claim 98 wherein the amount of return sludge is in the range of about 40% to about 100% by volume of the influent wastewater.

101. A method according to claim 96 wherein said oxidative process gas is introduced at a rate of about 10 SCFM or less per thousand cubic feet of liquid volume in said channel.

102. A method according to claim 96 where said oxidative process gas is introduced at a rate of about 8 SCFM or less per thousand cubic feet of liquid volume in said channel.

103. A method according to claim 96 wherein sufficient energy is imparted to said wastewater in said propulsion zone(s) to form a wave in the wastewater as it exits said propulsion zone or zones and to cause a rolling motion downstream of said zone(s) for creating currents in said wastewater that roll forward, downward, rearward and upward, thereby extending retention of gas bubbles and assisting in flocculation of suspended solids in wastewater.

104. A method according to claim 96 wherein energy is applied to said wastewater in said propulsion zone or zones at the rate of about 0.5 to about 5 adiabatic horsepower per million gallons of daily flow of wastewater through said plant.

105. A method according to claim 96 wherein energy is applied to said wastewater in said propulsion zone or zones at the rate of about 0.8 to about 3.5 adiabatic horsepower per million gallons of daily flow of wastewater through said plant.

106. A method according to claim 96 wherein energy is applied to said wastewater in said propulsion zone or zones at the rate of about 1 to about 3 adiabatic horsepower per million gallons of daily flow of wastewater through said plant.

107. A method in accordance with claim 96 wherein said wastewater includes suspended solids, said circulation of wastewater along said channel is at a velocity less than about 1 foot per second, and wherein the discharge of oxidative process gas through the horizontally non-propulsive bubble release means is distributed sufficiently extensively throughout the channel, and is sufficient in quantity and rate, when applied in combination with the upward motion imparted to the wastewater and suspended solids in said propulsion zone(s), for maintaining said suspended solids substantially in suspension outside said propulsion zone(s).

108. A method according to claim 107 wherein the combined effects of the quantity and rate of said discharge of said oxidative process gas are insufficient, in the absence of said upward motion in said propulsion zone(s), for maintaining said suspended solids substantially in suspension through the entire portion(s) of said channel outside the propulsion zone(s).

109. A method according to claim 108 wherein said oxidative process gas is introduced at an average rate of less than about 6 SCFM per thousand cubic feet of liquid volume in said channel.

110. A method according to claim 108 wherein said oxidative process gas is introduced at an average rate of less than about 0.12 SCFM per square foot of floor area of said channel.

111. A method according to claim 107 or 108 wherein the upward motion in said propulsion zone, in and of itself, is insufficient for maintaining said suspended solids substantially in suspension through the entire portion(s) of said channel outside the propulsion zone(s).

112. A method according to claim 107 or 108 wherein said upward motion in said propulsion zone(s) is caused by discharge of gas in said propulsion zone(s), and said upward motion, in and of itself, is insufficient for maintaining said suspended solids substantially in suspension through the entire portion(s) of said channel outside the propulsion zone(s).

113. A method according to claim 96 wherein said upward and forward motion is induced by discharge of gas in said propulsion zone(s).

114. A method according to claim 113 wherein:
said propulsion zone or zones comprise a transverse upstream water barrier and a transverse downstream water barrier defining said substantially upright chimney between them, and gas discharge means distributed in the chimney for causing said upward and forward motion;
said horizontal circulation is induced by said gas discharge means at an average velocity of less than one foot per second;
said wastewater includes suspended solids; and,
said suspended solids are maintained in suspension substantially throughout the channel by the combined lifting action of said gas discharge means and of said horizontally non-propulsive bubble release means.

115. A method according to claim 113 or 114 wherein said gas is discharged at an average rate of about 0.25 to about 3 SCFM per square foot of cross-sectional area, transverse to the direction of flow, inside said propulsion zone or zones.

116. A method according to claim 113 or 114 wherein said gas is discharged at an average rate of about 0.4 to about 1.2 SCFM per square foot of cross-sectional area, transverse to the direction of flow, inside said propulsion zone or zones.

117. A method according to claim 113 or 114 wherein said gas is discharged at an average rate of about 0.55 to about 0.9 SCFM per square foot of cross-sectional area, transverse to the direction of flow, inside said propulsion zone or zones.

118. A method according to claim 113 or 114 wherein said gas is discharged by at least one concentrated bubble diffuser in said propulsion zone or zones and said oxidative process gas is released through means for producing fine bubbles.

119. A method according to claim 113 or 114 wherein the gas for causing said upward and forward motion and the oxidative process gas are supplied from separate sources.

120. A method according to claim 113 or 114 wherein the rate of flow of gas into said propulsion zone or zones is varied independently of the rate of flow of oxidative process gas through said bubble release means.

121. A method according to claim 113 or 114 wherein the rate of flow of oxidative process gas through said bubble release means is varied independently of the rate of flow of gas into said propulsion zone or zones.

122. A method according to claim 96 wherein anaerobic conditions are maintained in a portion of said channel.

123. A method according to claim 96 wherein aerobic conditions are maintained substantially throughout said channel.

124. A method according to claim 96 wherein said ratio of horsepower is in the range of about 0.02 to about 0.25.

125. A method according to claim 96 wherein said ratio of horsepower is in the range of about 0.03 to about 0.2.

126. A method according to claim 96 wherein said wastewater has an oxygen demand (including that required for nitrification, if any) of at least about 100 ppm $BOD_5$ and wherein said wastewater is treated with at least about 800 pounds of oxygen per million gallons of plant throughput per day.

127. A method according to claim 126 wherein said oxygen demand is at least about 150 ppm and said oxygen treatment is at least about 1200 pounds of oxygen per million gallons of plant throughput per day.

128. A method according to claim 96 wherein the throughput of said wastewater is in the range of about 0.1 to about 2 million gallons of plant throughput per day.

129. A method according to claim 96 wherein the throughput of said wastewater is in the range of about 0.25 to about 1.5 million gallons of plant throughput per day.

130. A method according to claim 96 wherein said method is a multiple pass operation in which oxidative process gas addition, wastewater addition, return sludge addition, if any, and effluent water and sludge withdrawal are balanced to provide, in a retention time of about 12 to about 36 hours, either (A) a reduction of pollutants in the wastewater to levels of about 30 ppm $BOD_5$ or less and about 30 ppm suspended solids or less, or (B) a removal from the wastewater of about 90% of its initial $BOD_5$ and 90% of its initial suspended solids, and conversion to nitrate ion of substantially all of any ammonia which may have been present in the influent wastewater.

131. A method according to claim 130 wherein said retention time is in the range of about 15 to about 30 hours.

132. A method according to claim 130 wherein said retention time is in the range of about 18 to about 24 hours.

133. A method of aerating wastewater with flexible allocation of horsepower consumption between circulation and aeration, said method comprising:
inducing circulation of wastewater in a loop channel along a horizontal flow path at a circulation rate which averages less than about one foot per second over the transverse cross-section of said channel,
by discharging gas into said wastewater through gas discharge means for causing upward and forward motion of the wastewater as it passes through and exits at least one propulsion zone, said zone or zones,
being located in and extending transversely of said flow path, and
occupying a minor portion of the length of said flow path;
bubbling oxidative process gas into the wastewater along said flow path outside said propulsion zone(s) through horizontally non-propulsive bubble release means having an oxygen transfer efficiency of at least about six;
applying about 0.5 to about 5 adiabatic horsepower per million gallons of daily plant throughput for inducing said circulation, while varying the rate of release of oxidative process gas in response to the BOD of the wastewater and independently of the rate of discharge through said gas discharge means, and maintaining the ratio of said horsepower relative to the total of said horsepower plus the adiabatic horsepower consumed in non-propulsive bubbling of process gas in the wastewater in the range of about 0.01 to about 0.35.

* * * * *